(12) United States Patent
Weber et al.

(10) Patent No.: US 6,641,883 B2
(45) Date of Patent: *Nov. 4, 2003

(54) HIGH EFFICIENCY OPTICAL DEVICES

(75) Inventors: Michael F. Weber, Shoreview, MN (US); David L. Wortman, St. Paul, MN (US); Andrew J. Ouderkirk, Woodbury, MN (US); Sanford Cobb, Jr., St. Mary's Point, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/777,455

(22) Filed: Feb. 6, 2001

(65) Prior Publication Data

US 2001/0021445 A1 Sep. 13, 2001

Related U.S. Application Data

(62) Division of application No. 09/461,245, filed on Dec. 15, 1999, now Pat. No. 6,210,785, which is a continuation of application No. 08/494,366, filed on Jun. 26, 1995, now Pat. No. 6,080,467.

(51) Int. Cl.[7] ............... B32B 7/02; G02B 27/00; G02B 27/10; G02B 27/28

(52) U.S. Cl. ............... 428/35.7; 428/34.1; 428/36.9; 428/212; 359/485; 359/487; 359/489; 359/494; 359/497; 359/500; 359/591; 359/592; 359/595; 359/597; 359/598

(58) Field of Search ................ 359/591, 592, 359/595, 597, 598, 485, 487, 489, 494, 495, 497, 500; 385/146, 129; 428/212, 34.1, 35.7, 36.9

(56) References Cited

U.S. PATENT DOCUMENTS

| | | |
|---|---|---|
| 540,768 A | 6/1895 | Western |
| 3,124,639 A | 3/1964 | Kahn |
| 3,442,755 A | 5/1969 | Walters et al. |
| 3,535,016 A | 10/1970 | Malifaud |
| 3,565,985 A | 2/1971 | Schrenk et al. |
| 3,610,729 A | 10/1971 | Rogers |
| 3,637,455 A | 1/1972 | Pearson et al. |
| 3,647,612 A | 3/1972 | Schrenk et al. |
| 3,711,176 A | 1/1973 | Alfrey, Jr. et al. |
| 3,740,112 A * | 6/1973 | Lundgren .............. 350/96 T |

(List continued on next page.)

FOREIGN PATENT DOCUMENTS

| | | |
|---|---|---|
| CA | 1327286 | 3/1994 |
| EP | 0 062 751 | 10/1982 |

(List continued on next page.)

OTHER PUBLICATIONS

Alfrey, Jr. et al., Physical Optics of Iridescent Multilayered Plastic Films, Polymer Engineering and Science, vol. 9, No. 6, Nov. 1969.

Boese, D. et al., Chain Orientation and Anisotropies in Optical and Dielectric Properties in Thin Films of Stiff Polyimides, J. Poly. Sci.: Part B, 30:1321 (1992).

(List continued on next page.)

Primary Examiner—Vivian Chen
(74) Attorney, Agent, or Firm—Stephen C. Jensen; John A. Burtis

(57) ABSTRACT

Optical devices such as light pipes which incorporate multilayer optical films in which the refractive indices of two adjacent layers in the thickness direction are substantially matched or are small relative to the difference in refractive indices of said two adjacent layers in an given in-plane direction which is at least 0.05. The multilayer optical film exhibits low absorptivity and can reflect light approaching at shallow angles as well as normal to the film.

25 Claims, 10 Drawing Sheets

U.S. PATENT DOCUMENTS

| | | |
|---|---|---|
| 3,759,647 A | 9/1973 | Schrenk et al. |
| 3,772,882 A | 11/1973 | Schrenk |
| 3,801,429 A | 4/1974 | Schrenk et al. |
| 3,860,036 A | 1/1975 | Newman, Jr. |
| 4,025,688 A | 5/1977 | Nagy et al. |
| 4,094,947 A | 6/1978 | Alfrey, Jr. et al. |
| 4,268,127 A | 5/1981 | Oshima et al. |
| 4,310,584 A | 1/1982 | Cooper et al. |
| 4,315,258 A | 2/1982 | McKnight et al. |
| 4,329,382 A | 5/1982 | Truskolaski et al. |
| 4,446,305 A | 5/1984 | Rogers et al. |
| 4,476,168 A | 10/1984 | Aoyama |
| 4,500,173 A | 2/1985 | Leibowitz et al. |
| 4,515,441 A | 5/1985 | Wentz |
| 4,515,837 A | 5/1985 | Cheng |
| 4,520,189 A | 5/1985 | Rogers et al. |
| 4,521,588 A | 6/1985 | Rogers et al. |
| 4,525,413 A | 6/1985 | Rogers et al. |
| 4,540,623 A | 9/1985 | Im et al. |
| 4,688,897 A | 8/1987 | Grinberg et al. |
| 4,720,426 A | 1/1988 | Englert et al. |
| 4,791,540 A | 12/1988 | Dreyer, Jr. et al. |
| 4,797,308 A | 1/1989 | Mattin |
| 4,805,984 A * | 2/1989 | Cobb, Jr. ............... 350/96.28 |
| 4,813,765 A | 3/1989 | Negishi |
| 4,937,134 A | 6/1990 | Schrenk et al. |
| 5,089,318 A | 2/1992 | Shetty et al. |
| 5,094,788 A | 3/1992 | Schrenk et al. |
| 5,094,793 A | 3/1992 | Schrenk et al. |
| 5,095,210 A | 3/1992 | Wheatley et al. |
| 5,103,337 A | 4/1992 | Schrenk et al. |
| 5,122,905 A | 6/1992 | Wheatley et al. |
| 5,122,906 A | 6/1992 | Wheatley |
| 5,126,880 A | 6/1992 | Wheatley et al. |
| 5,149,578 A | 9/1992 | Wheatley et al. |
| 5,188,760 A | 2/1993 | Hikmet et al. |
| 5,202,074 A | 4/1993 | Schrenk et al. |
| 5,202,950 A * | 4/1993 | Arego et al. ............... 385/146 |
| 5,211,878 A | 5/1993 | Reiffenrath et al. |
| 5,217,794 A | 6/1993 | Schrenk |
| 5,233,465 A | 8/1993 | Wheatley et al. |
| 5,234,729 A | 8/1993 | Wheatley et al. |
| 5,235,443 A | 8/1993 | Barnik et al. ............... 359/37 |
| 5,269,995 A | 12/1993 | Ramanathan et al. ....... 264/171 |
| 5,278,694 A | 1/1994 | Wheatley et al. ........... 359/359 |
| 5,294,657 A | 3/1994 | Melendy et al. ............. 524/270 |
| 5,303,322 A * | 4/1994 | Winston et al. ............. 385/146 |
| RE34,605 E | 5/1994 | Schrenk et al. ............. 359/359 |
| 5,316,703 A | 5/1994 | Schrenk ...................... 264/1.3 |
| 5,319,478 A | 6/1994 | FIjnfschilling et al. ....... 359/53 |
| 5,339,198 A | 8/1994 | Wheatley et al. ........... 359/359 |
| 5,353,154 A | 10/1994 | Lutz et al. .................. 359/582 |
| 5,360,659 A | 11/1994 | Arends et al. ............... 428/216 |
| 5,389,324 A | 2/1995 | Lewis et al. ................. 264/171 |
| 5,422,756 A | 6/1995 | Weber ........................ 359/487 |
| 5,424,119 A | 6/1995 | Phillips et al. ............... 428/328 |
| 5,448,404 A | 9/1995 | Schrenk et al. ............. 359/584 |
| 5,451,449 A | 9/1995 | Shetty et al. ............... 428/195 |
| 5,468,523 A | 11/1995 | Huss et al. |
| 5,481,445 A | 1/1996 | Sitzema et al. ............. 362/308 |
| 5,486,884 A | 1/1996 | De Vaan ...................... 353/122 |
| 5,486,935 A | 1/1996 | Kalmanash ................. 359/37 |
| 5,486,949 A | 1/1996 | Schrenk et al. ............. 359/498 |
| 5,540,978 A | 7/1996 | Schrenk ....................... 428/212 |
| 5,550,660 A | 8/1996 | Yang .......................... 359/63 |
| 5,552,927 A | 9/1996 | Wheatly et al. ............. 359/359 |
| 5,568,316 A | 10/1996 | Schrenk et al. ............. 359/584 |
| 5,612,820 A | 3/1997 | Schrenk et al. ............. 359/498 |
| 5,614,274 A | 3/1997 | Huss |
| 5,629,055 A | 5/1997 | Revol et al. .................. 428/1 |
| 5,686,979 A | 11/1997 | Weber et al. ................. 349/96 |
| 5,699,188 A | 12/1997 | Gilbert et al. ............... 359/584 |
| 5,721,603 A | 2/1998 | De Vaan et al. ............. 349/194 |
| 5,744,534 A | 4/1998 | Ishiharada et al. .......... 524/442 |
| 5,751,388 A | 5/1998 | Larson ........................ 349/96 |
| 5,767,935 A | 6/1998 | Ueda et al. ................. 349/112 |
| 5,770,306 A | 6/1998 | Suzuki et al. ............... 428/328 |
| 5,783,120 A | 7/1998 | Ouderkirk et al. .......... 264/134 |
| 5,793,456 A | 8/1998 | Broer et al. .................. 349/98 |
| 5,808,794 A | 9/1998 | Weber et al. ................. 359/487 |
| 5,825,542 A | 10/1998 | Cobb, Jr. et al. ............ 359/487 |
| 5,825,543 A | 10/1998 | Ouderkirk et al. .......... 359/494 |
| 5,882,774 A | 3/1999 | Jonza et al. ................. 428/212 |
| 5,940,149 A | 8/1999 | Vanderwerf .................... 349/5 |
| 5,962,114 A | 10/1999 | Jonza et al. ................. 428/212 |
| 5,965,247 A | 10/1999 | Jonza et al. ................. 428/212 |
| 6,080,467 A | 6/2000 | Weber et al. |
| 6,082,876 A * | 7/2000 | Hanson et al. .............. 362/293 |
| 6,210,785 B1 | 4/2001 | Weber et al. |
| 2002/0008970 A1 | 1/2002 | Hanson et al. |

FOREIGN PATENT DOCUMENTS

| | | |
|---|---|---|
| EP | 469 732 | 2/1992 |
| EP | 514 223 | 11/1992 |
| EP | 597 261 | 5/1994 |
| EP | 606 939 | 7/1994 |
| EP | 426 636 | 3/1998 |
| GB | 2028528 | 6/1979 |
| JP | 5-288910 | 11/1993 |
| JP | 6-11607 | 1/1994 |
| JP | 7-216328 | 8/1995 |
| WO | WO 91/09719 | 7/1991 |
| WO | WO 95/27919 | 4/1995 |
| WO | WO 95/17303 | 6/1995 |
| WO | WO 95/17691 | 6/1995 |
| WO | WO 95/17692 | 6/1995 |
| WO | WO 95/17699 | 6/1995 |
| WO | WO 96/19347 | 6/1996 |
| WO | WO 96/31794 | 10/1996 |
| WO | WO 97/01440 | 1/1997 |
| WO | WO 97/01774 | 1/1997 |
| WO | WO 97/32226 | 9/1997 |
| WO | WO 99/36248 | 7/1999 |
| WO | WO 99/36262 | 7/1999 |

OTHER PUBLICATIONS

Hodgkinson et al., Effective principal refractive indices and column angles for periodic stacks of thin birefringent films, Optical Society of America, vol. 10, No. 9, p. 2065–2071, Sep. 1993, pp. 2065–2071.

Im, J. et al., Coextruded Microlayer Film and Sheet, Journal of Plastic Film and Sheeting, vol. 4, p. 104–15 (Apr., 1988).

Radford et al., Reflectivity of Iridescent Coextruded Multi-layered Plastic Films, Polymer Engineering and Science, vol. 13, No. 3, (May 1973); Dow Chemical Co., American Chemical Society Symposium on "Coextruded Plastic Films, Fibers, Composites", Apr. 9–14, 1972.

Scheffer, Terry J., "Twisted Nematic Display with Cholesteric Reflector", Journal of Applied Physics, vol. 8, pp. 1441–1448 (1975).

Schrenk et al., Nanolayer polymeric optical films, Tappi Journal, pp. 169–174, Jun., 1992.

Schrenk et al., Interfacial Flow Instability in Multilayer Coextrusion, Polymer Engineering and Science, vol. 18(8), p. 620–3 (Jun. 1978).

Schrenk et al., Coextruded Multilayer Polymer Films and Sheet, Chapt. 15, Polymer Blends, vol. 2, 129, Academic Press, Inc. (1978).

Schrenk et al., Coextruded Elastomeric Optical Interference Films, SPE Anuual Technical Conference, Atlanta, Georgia, 1703 (1988).

Schrenk, W., New Developments in Coextrusion, International Conference on Advances In Polymer Processing, New Orleans, Louisiana, (Apr., 1991).

Schrenk, W. et al., Coextruded Iridescent Film, TAPPI Paper Synthetics Conference, Atlanta, Georgia, p. 141–5 (Sep. 27–29, 1976).

Schrenk, W. et al., Coextruded Infrared Reflecting Films, 7th Annual Meeting Polymer Processing Society, Hamilton, Ontario, Canada, p. 222–3 (Apr. 1991).

Weber et al., "Giant Birefringent Optics in Multilayer Polymer Mirrors", Science, vol. 287, Mar. 31, 2000, pp. 2451–2456.

Zang, D.Y. et al., Giant anisotropies in the dielectric properties of quasi–epitaxial crystalline organic semiconductor thin films, Appl. Phys. Letters, 59:823 (1991).

Hecht, Eugene, and Alfred Zajac, *Optics*, Fourth Printing, Addison–Wesley Publishing Company, Feb. 1979, pp. 301–316.

* cited by examiner-

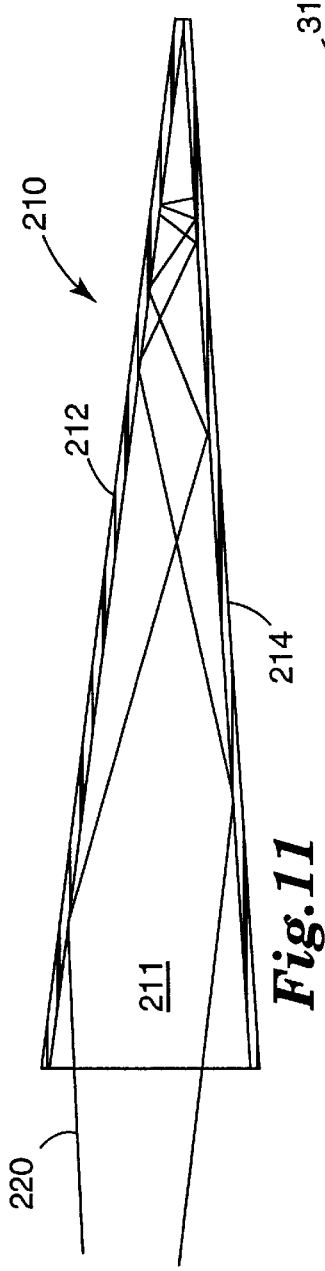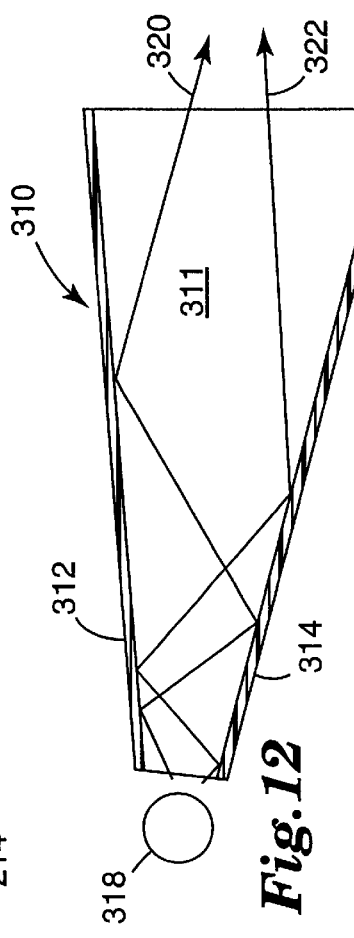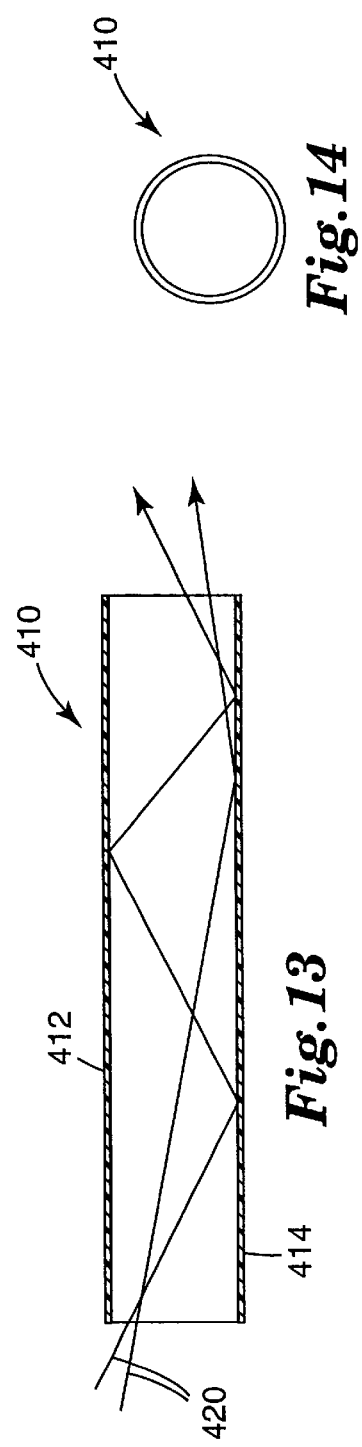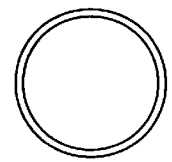

HIGH EFFICIENCY OPTICAL DEVICES

CROSS REFERENCE TO RELATED APPLICATIONS

This is a divisional of application Ser. No. 09/461,245, filed Dec. 15, 1999, now issued as U.S. Pat. No. 6,210,785, which is a continuation of application Ser. No. 08/494,366, filed Jun. 26, 1995, now issued as U.S. Pat. No. 6,080,467.

FIELD OF THE INVENTION

The present invention relates to the field of optical devices. More particularly, the present invention relates to optical devices employing multi-layer optical film as reflectors and/or polarizers.

BACKGROUND OF THE INVENTION

Optical devices employing reflectors are used, for example, in displays for laptop computers, hand-held calculators, digital watches and similar devices as well as illuminated signs, light pipes, backlight assemblies and many other devices.

Conventional reflectors, including pigmented surfaces, silvered mirrors, polished metallic or metallized surfaces, etc. suffer from a number of disadvantages in many applications. The conventional reflectors suffer from relatively high absorbance of light incident on their surfaces, typically absorbing about 4–10% of the light incident on them. As a result, the amount of light remaining after each reflection is less than that initially provided. In devices in which multiple reflections are encountered, the overall output of the optical device can be substantially limited. In addition, many of the conventional reflectors are too bulky and/or heavy for many of the applications, particularly in laptop computer displays and other portable devices.

Many optical devices use polarizers, either alone or in combination with reflectors, to provide light having substantially one plane of polarization. Polarized light is especially useful in conjunction with liquid crystal (LC) displays used in many portable devices such as laptop computers and watches, because the LC displays rely on polarized light passing through the LC to display information to a viewer.

Polarizers can be generally categorized as either absorptive or reflective. Typical absorptive polarizers are oriented dyed polymer films, while typical reflective polarizers are tilted thin film polarizers, also known as MacNeille polarizers. Absorptive polarizers do, of course, contribute to the absorptive losses of optical devices in which they are used, thereby limiting the output of those devices.

The absorptive losses of known reflectors and polarizers become much more important when the optical devices are used with a brightness enhancement film such as microreplicated brightness enhancement film or any other type of reflective polarizer which causes light to typically travel through several reflections, thereby amplifying absorptive losses with every reflection. In the highest gain configurations, for, e.g., a single sheet of brightness enhancement film in combination with a reflective polarizer and back reflector, or two sheets of orthogonally crossed sheets of brightness enhancement film, the effective absorptive losses can reduce the total potential light output of an optical display by 10–30%.

This principle of absorptive losses also applies to optical devices employing non-totally internally reflecting surfaces. One example is an optical wedge in which light is directed into a structure having converging reflective surfaces. Optical wedges will typically reflect light many times before it exits the device. With each reflection, however, some of the light which entered the wedge is absorbed by conventional reflectors. As a result, the amount of light exiting the device is typically substantially less than the light entering the device.

Another optical device typically employing reflective surfaces is an illuminated sign which relies on a finite number of light sources and multiple reflections within an optical cavity to disperse the light to illuminate the surface of a sign in a generally uniform manner. To overcome the problems associated with absorptive losses, many signs typically employ numerous light sources, thereby increasing the cost to manufacture and operate the signs.

Yet another optical device which is limited by absorption losses is a light pipe in which light enters the pipe and is reflected along its length numerous times before exiting at a desired location. Each reflection results in some absorption when conventional reflectors are used, thereby limiting throughput of the light pipe.

To overcome some of the problems of weight, bulk and absorption of conventional reflectors, multi-layered polymer films have been used to reflect and/or polarize light. Such polymeric films are, however, subject to a number of other disadvantages including iridescence, as well as poor reflectivity when off-axis light approaches the surface of the film. The off-axis light is typically transmitted through the films, rather than being reflected, thereby resulting in transmissive losses rather than absorptive losses. Whether light is lost through absorption or transmission, however, the output of the optical device is limited.

Other problems with known multi-layer polymer films used to provide reflectors and/or polarizers is that the materials and methods used to manufacture the films presents serious problems due to poor optical transmission, extrudibility, and high costs.

SUMMARY OF THE INVENTION

Optical devices according to the present invention include a multilayer optical film. Optical devices incorporating multilayer optical film according to the present invention enjoy many advantages due to the low absorptivity of the film and its ability to reflect light approaching at shallow angles as well as normal to the film.

In those situations where complete reflectivity is desired, optical devices employing a multilayer optical film according to the present invention can reflect over 99% of the light striking the surface of the film.

If a reflective polarizer is desired, the optical devices can be constructed with a multilayer optical film which transmits a significant amount of light having one plane of polarization while reflecting a significant amount of light having an orthogonally oriented polarization. A further advantage is that the relative percentages of transmitted/reflected light can be largely controlled by the multilayer optical film used in the present invention.

As a result of the unique properties of the multilayer optical film, optical devices according to the present invention are highly efficient at reflecting and transporting light and/or transmitting light of one polarization, whether the light is incident normal to the film surface or off-axis.

Another advantage of optical devices employing multilayer optical film according to the present invention which rely on reflection to transport light is that the devices need not have symmetry to reduce the number of reflections needed to transmit light due to the low absorptivity of the multilayer optical film.

Yet another advantage of optical devices employing multilayer optical films according to the present invention is their relatively low weight as compared to many conventional reflectors and/or polarizers.

Still another advantage of optical devices employing multilayer optical films according to the present invention is that because the film is relatively thin as compared to many conventional reflectors and/or polarizers, the optical devices can be manufactured to occupy limited space in a system employing the device.

Additional features and advantages of optical devices according to the present invention will be apparent upon reading the detailed description of illustrative embodiments below.

BRIEF DESCRIPTION OF THE DRAWINGS

FIG. 11 is a schematic cross-sectional diagram of a converging wedge optical device according to the present invention.

FIG. 12 is a schematic cross-sectional diagram of a diverging wedge optical device according to the present invention.

FIG. 13 is a schematic cross-sectional diagram of a light pipe employing multilayer optical films according to the present invention.

FIG. 14 is a schematic cross-sectional diagram of the device of FIG. 13, taken along a plane transverse to the longitudinal axis of the light pipe.

DETAILED DESCRIPTION OF ILLUSTRATIVE EMBODIMENTS OF THE INVENTION

I. Multilayer Optical Film

The optical devices described herein rely on the unique and advantageous properties of multilayer optical films. The advantages, characteristics and manufacturing of such films are most completely described in U.S. Pat. No. 5,882,774. The multilayer optical film is useful, for example, as highly efficient mirrors and/or polarizers. A relatively brief description of the properties and characteristics of the multilayer optical film is presented below followed by a description of illustrative embodiments of backlight systems using the multilayer optical film according to the present invention.

Multilayer optical films as used in conjunction with the present invention exhibit relatively low absorption of incident light, as well as high reflectivity for off-axis as well as normal light rays. These properties generally hold whether the films are used for pure reflection or reflective polarization of light. The unique properties and advantages of the multi-layer optical film provides an opportunity to design highly efficient backlight systems which exhibit low absorption losses when compared to known backlight systems.

Figure 1A:
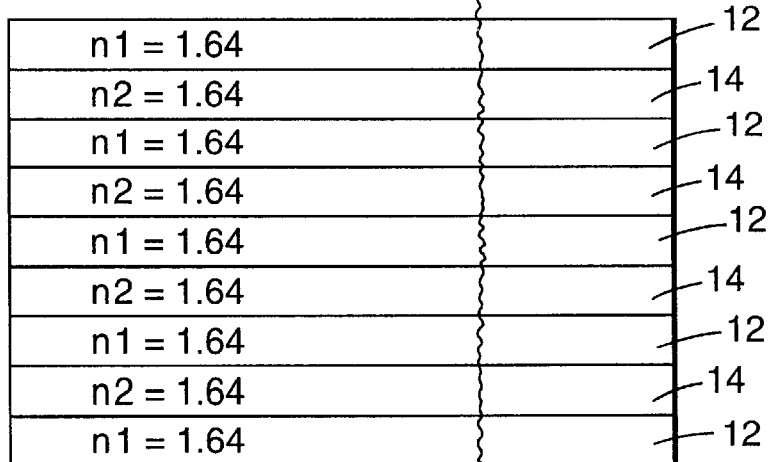
FIGS. 1a and 1b are diagrammatical views of the multilayer optical film of the present invention.
Figure 1B:
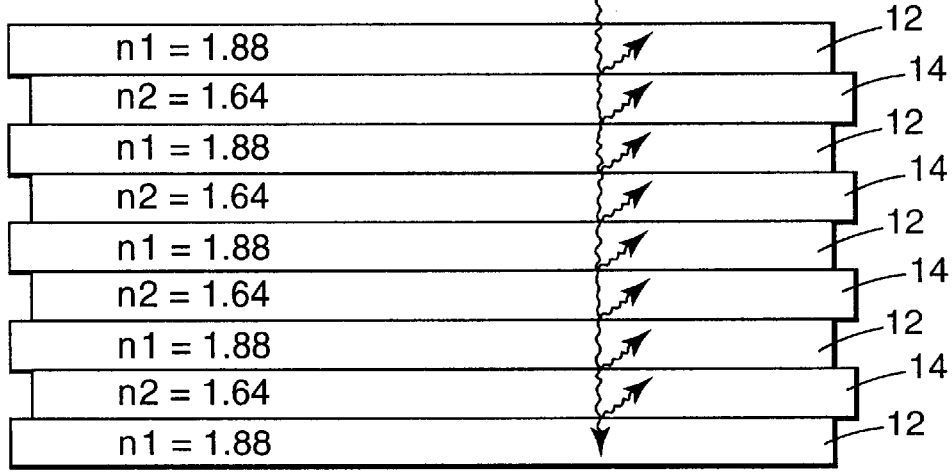

An exemplary multilayer optical film of the present invention as illustrated in FIGS. 1A and 1B includes a multilayer stack 10 having alternating layers of at least two materials 12 and 14. At least one of the materials has the property of stress induced birefringence, such that the index of refraction (n) of the material is affected by the stretching process. FIG. 1A shows an exemplary multilayer stack before the stretching process in Which both materials have the same index of refraction. Light ray 13 experiences no index of refraction change and passes through the stack. In FIG. 1B, the same stack has been stretched, thus increasing the index of refraction of material 12. The difference in refractive index at each boundary between layers will cause part of ray 15 to be reflected. By stretching the multilayer stack over a range of uniaxial to biaxial orientation, a film is created with a range of reflectivities for differently oriented plane-polarized incident light. The multilayer stack can thus be made useful as reflective polarizers or mirrors.

Multilayer optical films constructed according to the present invention exhibit a Brewster angle (the angle at which reflectance goes to zero for light incident at any of the layer interfaces) which is very large or is nonexistent. In contrast, known multilayer polymer films exhibit relatively small Brewster angles at layer interfaces, resulting in transmission of light and/or undesirable iridescence. The multilayer optical films according to the present invention, however, allow for the construction of mirrors and polarizers whose reflectivity for p polarized light decrease slowly with angle of incidence, are independent of angle of incidence, or increase with angle of incidence away from the normal. As a result, multilayer stacks having high reflectivity for both s and p polarized light over a wide bandwidth, and over a wide range of angles can be achieved.

Figure 2:
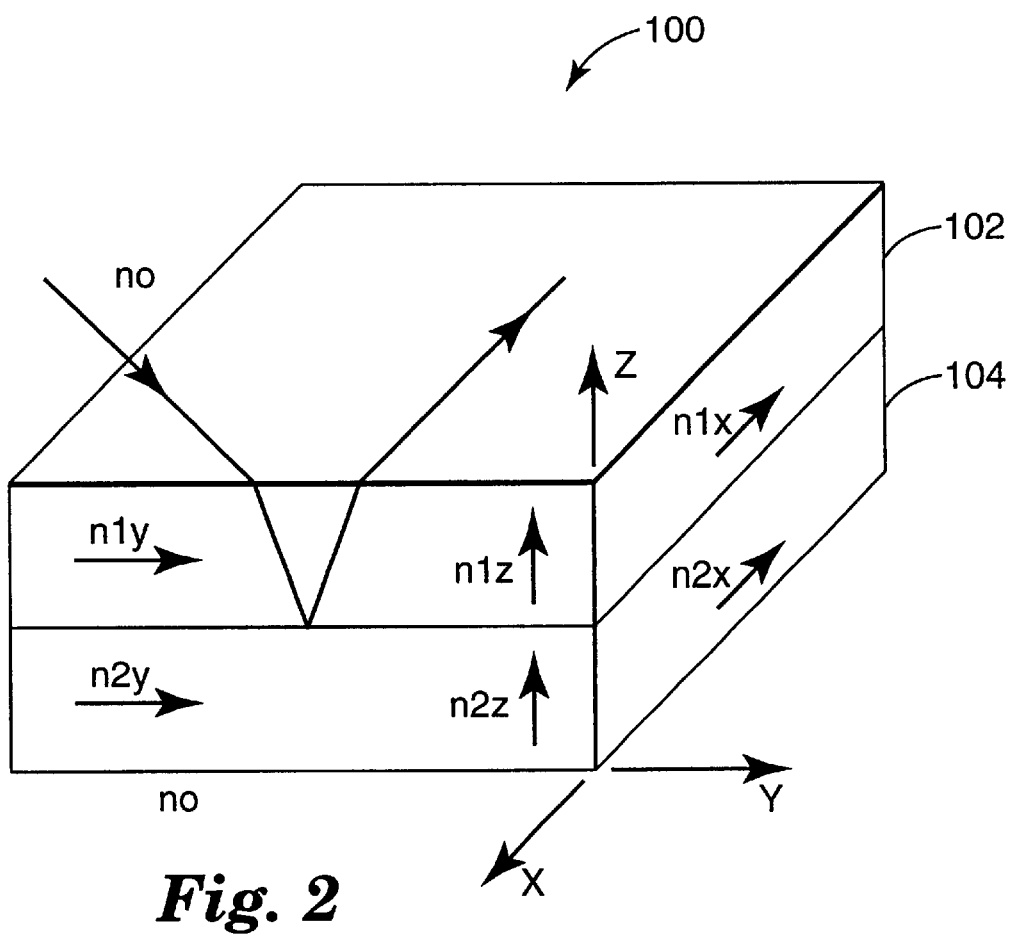
FIG. 2 depicts a two layer stack of films forming a single interface.

FIG. 2 shows two layers of a multilayer stack, and indicates the three dimensional indices of refraction for each layer. The indices of refraction for each layer are n1x, n1y, and n1z for layer 102, and n2x, n2y, and n2z for layer 104. The relationships between the indices of refraction in each film layer to each other and to those of the other layers in the film stack determine the reflectance behavior of the multilayer stack at any angle of incidence, from any azimuthal direction. The principles and design considerations described in U.S. Pat. No. 5,882,774 can be applied to create multilayer stacks having the desired optical effects for a wide variety of circumstances and applications. The indices of refraction of the layers in the multilayer stack can be manipulated and tailored to produce the desired optical properties.

Referring again to FIG. 1B, the multilayer stack 10 can include tens, hundreds or thousands of layers, and each layer can be made from any of a number of different materials. The characteristics which determine the choice of materials for a particular stack depend upon the desired optical performance of the stack. The stack can contain as many materials as there are layers in the stack. For ease of manufacture, preferred optical thin film stacks contain only a few different materials.

The boundaries between the materials, or chemically identical materials with different physical properties, can be abrupt or gradual. Except for some simple cases with analytical solutions, analysis of the latter type of stratified media with continuously varying index is usually treated as a much larger number of thinner uniform layers having abrupt boundaries but with only a small change in properties between adjacent layers.

The preferred multilayer stack is comprised of low/high index pairs of film layers, wherein each low/high index pair of layers has a combined optical thickness of ½ the center wavelength of the band it is designed to reflect. Stacks of such films are commonly referred to as quarterwave stacks. For multilayer optical films concerned with the visible and the near infrared wavelengths, a quarterwave stack design results in each of the layers in the multilayer stack having an average thickness of not more than 0.5 microns.

In those applications where reflective films (e.g. mirrors) are desired, the desired average transmission for light of each polarization and plane of incidence generally depends upon the intended use of the reflective film. One way to produce a multilayer mirror film is to biaxially stretch a multilayer stack which contains a birefringent material as the high index layer of the low/high index pair. For a high efficiency reflective film, average transmission along each stretch direction at normal incidence over the visible spectrum (400–700 nm) is desirably less than 10% (reflectance greater than 90%), preferably less than 5% (reflectance greater than 95%), more preferably less than 2% (reflectance greater than 98%), and even more preferably less than 1% (reflectance greater than 99%). The average transmission at 60 degrees from the normal from 400–700 nm is desirably less than 20% (reflectance greater than 80%), preferably less than 10% (reflectance greater than 90%), more preferably less than 5% (reflectance greater than 95%), and even more preferably less than 2% (reflectance greater than 98%), and even more preferably less than 1% (reflectance greater than 99%).

In addition, asymmetric reflective films may be desirable for certain applications. In that case, average transmission along one stretch direction may be desirably less than, for example, 50%, while the average transmission along the other stretch direction may be desirably less than, for example 20%, over a bandwidth of, for example, the visible spectrum (400–700 nm), or over the visible spectrum and into the near infrared (e.g, 400–850 nm).

Multilayer optical films can also be designed to operate as reflective polarizers. One way to produce a multilayer reflective polarizer is to uniaxially stretch a multilayer stack which contains a birefringent material as the high index layer of the low/high index pair. The resulting reflective polarizers have high reflectivity for light with its plane of polarization parallel to one axis (in the stretch direction) for a broad range of angles of incidence, and simultaneously have low reflectivity and high transmissivity for light with its plane of polarization parallel to the other axis (in the non-stretch direction) for a broad range of angles of incidence. By controlling the three indices of refraction of each film, nx, ny and nz, the desired polarizer behavior can be obtained.

For many applications, the ideal reflecting polarizer has high reflectance along one axis (the so-called extinction axis) and zero reflectance along the other (the so-called transmission axis), at all angles of incidence. For the transmission axis of a polarizer, it generally desirable to maximize transmission of light polarized in the direction of the transmission axis over the bandwidth of interest and also over the range of angles of interest.

The average transmission at normal incidence for a polarizer in the transmission axis across the visible spectrum (400–700 nm for a bandwidth of 300 nm) is desirably at least 50%, preferably at least 70%, more preferably at least 85%, and even more preferably at least 90%. The average transmission at 60 degrees from the normal (measured along the transmission axis for p-polarized light) for a polarizer from 400–700 nm is desirably at least 50%, preferably at least 70%, more preferably at least 80%, and even more preferably at least 90%.

The average transmission for a multilayer reflective polarizer at normal incidence for light polarized in the direction of the extinction axis across the visible spectrum (400–700 nm for a bandwidth of 300 nm) is desirably at less than 50%, preferably less than 30%, more preferably less than 15%, and even more preferably less than 5%. The average transmission at 60 degrees from the normal (measured along the transmission axis for p-polarized light) for a polarizer for light polarized in the direction of the extinction axis from 400–700 nm is desirably less than 50%, preferably less than 30%, more preferably less than 15%, and even more preferably less than 5%.

For certain applications, high reflectivity for p-polarized light with its plane of polarization parallel to the transmission axis at off-normal angles are preferred. The average reflectivity for light polarized along the transmission axis should be more than 20% at an angle of at least 30 degrees from the normal.

In addition, although reflective polarizing films and asymmetric reflective films are discussed separately herein, it should be understood that two or more of such films could be provided to reflect substantially all light incident on them (provided they are properly oriented with respect to each other to do so). This construction is typically desired when the multilayer optical film is used as a reflector in a backlight system according to the present invention.

If some reflectivity occurs along the transmission axis, the efficiency of the polarizer at off-normal angles may be reduced. If the reflectivity along the transmission axis is different for various wavelengths, color may be introduced into the transmitted light. One way to measure the color is to determine the root mean square (RMS) value of the transmissivity at a selected angle or angles over the wavelength range of interest. $C_{RMS}$, can be determined according to the equation:

$$C_{RMS} = \frac{\int_{\lambda 1}^{\lambda 2} ((T - \overline{T})^2)^{1/2} d\lambda}{\overline{T}(\lambda 2 - \lambda 1)}$$

where the range $\lambda 1$ to $\lambda 2$ is the wavelength range, or bandwidth, of interest, T is the transmissivity along the transmission axis, and $\overline{T}$ is the average transmissivity along the transmission axis in the wavelength range of interest. For applications where a low color polarizer is desirable, the % RMS color should be less than 10%, preferably less than 8%, more preferably less than 3.5%, and even more preferably less than 2% at an angle of at least 30 degrees from the normal, preferably at least 45 degrees from the normal, and even more preferably at least 60 degrees from the normal.

Preferably, a reflective polarizer combines the desired % RMS color along the transmission axis for the particular application with the desired amount of reflectivity along the extinction axis across the bandwidth of interest. For polarizers having a bandwidth in the visible range (400–700 nm, or a bandwidth of 300 nm), average transmission along the extinction axis at normal incidence is desirably less than 40%, more desirably less than 25%, preferably less than 15%, more preferably less than 5% and even more preferably less than 3%.

Materials Selection and Processing

With the design considerations described in the above mentioned U.S. Pat. No. 5,882,774, one of ordinary skill will readily appreciate that a wide variety of materials can be used to form multilayer reflective films or polarizers according to the invention when processed under conditions selected to yield the desired refractive index relationships. The desired refractive index relationships can be achieved in a variety of ways, including stretching during or after film formation (e.g., in the case of organic polymers), extruding (e.g., in the case of liquid crystalline materials), or coating. In addition, it is preferred that the two materials have similar rheological properties (e.g., melt viscosities) such that they can be co-extruded.

In general, appropriate combinations may be achieved by selecting, as the first material, a crystalline or semi-crystalline material, preferably a polymer. The second material, in turn, may be crystalline, semi-crystalline, or amorphous. The second material may have a birefringence opposite of the first material. Or, the second material may have no birefringence, or less birefringence than the first material.

Specific examples of suitable materials include polyethylene naphthalate (PEN) and isomers thereof (e.g., 2,6-, 1,4-, 1,5-, 2,7-, and 2,3-PEN), polyalkylene terephthalates (e.g., polyethylene terephthalate, polybutylene terephthalate, and poly-1,4-cyclohexanedimethylene terephthalate), polyimides (e.g., polyacrylic imides), polyetherimides, atactic polystyrene, polycarbonates, polymethacrylates (e.g., polyisobutyl methacrylate, polypropylmethacrylate, polyethylmethacrylate, and polymethylmethacrylate), polyacrylates (e.g., polybutylacrylate and polymethylacrylate), syndiotactic polystyrene (sPS), syndiotactic poly-alpha-methyl styrene, syndiotactic polydichlorostyrene, copolymers and blends of any of these polystyrenes, cellulose derivatives (e.g., ethyl cellulose, cellulose acetate, cellulose propionate, cellulose acetate butyrate, and cellulose nitrate), polyalkylene polymers (e.g., polyethylene, polypropylene, polybutylene, polyisobutylene, and poly(4-methyl)pentene), fluorinated polymers (e.g., perfluoroalkoxy resins, polytetrafluoroethylene, fluorinated ethylene-propylene copolymers, polyvinylidene fluoride, and polychlorotrifluoroethylene), chlorinated polymers (e.g., polyvinylidene chloride and polyvinylchloride), polysulfones, polyethersulfones, polyacrylonitrile, polyamides, silicone resins, epoxy resins, polyvinylacetate, polyether-amides, ionomeric resins, elastomers (e.g., polybutadiene, polyisoprene, and neoprene), and polyurethanes. Also suitable are copolymers, e.g., copolymers of PEN (e.g., copolymers of 2,6-, 1,4-, 1,5-, 2,7-, and/or 2,3-naphthalene dicarboxylic acid, or esters thereof, with (a) terephthalic acid, or esters thereof; (b) isophthalic acid, or esters thereof; (c) phthalic acid, or esters thereof; (d) alkane glycols; (e) cycloalkane glycols (e.g., cyclohexane dimethane diol); (f) alkane dicarboxylic acids; and/or (g) cycloalkane dicarboxylic acids (e.g., cyclohexane dicarboxylic acid)), copolymers of polyalkylene terephthalates (e.g., copolymers of terephthalic acid, or esters thereof, with (a) naphthalene dicarboxylic acid, or esters thereof; (b) isophthalic acid, or esters thereof; (c) phthalic acid, or esters thereof; (d) alkane glycols; (e) cycloalkane glycols (e.g., cyclohexane dimethane diol); (f) alkane dicarboxylic acids; and/or (g) cycloalkane dicarboxylic acids (e.g., cyclohexane dicarboxylic acid)), and styrene copolymers (e.g., styrene-butadiene copolymers and styrene-acrylonitrile copolymers), 4,4'-bibenzoic acid and ethylene glycol. In addition, each individual layer may include blends of two or more of the above-described polymers or copolymers (e.g., blends of sPS and atactic polystyrene). The coPEN described may also be a blend of pellets where at least one component is a polymer based on naphthalene dicarboxylic acid and other components are other polyesters or polycarbonates, such as a PET, a PEN or a co-PEN.

Particularly preferred combinations of layers in the case of polarizers include PEN/co-PEN, polyethylene terephthalate (PET)/co-PEN, PEN/sPS, PET/sPS, PEN/EASTAR, and PET/EASTAR, where "co-PEN" refers to a copolymer or blend based upon naphthalene dicarboxylic acid (as described above) and EASTAR is polycyclohexanedimethylene terephthalate commercially available from Eastman Chemical Co.

Particularly preferred combinations of layers in the case of reflective films include PET/ECDEL, PEN/ECDEL, PEN/sPS, PEN/THV, PEN/co-PET, and PET/sPS, where "co-PET" refers to a copolymer or blend based upon terephthalic acid (as described above), ECDEL is a thermoplastic polyester commercially available from Eastman Chemical Co., and THV is a fluoropolymer commercially available from Minnesota Mining and Manufacturing Company, St. Paul, Minn.

The number of layers in the film is selected to achieve the desired optical properties using the minimum number of layers for reasons of film thickness, flexibility and economy. In the case of both polarizers and reflective films, the number of layers is preferably less than 10,000, more preferably less than 5,000, and even more preferably less than 2,000.

As discussed above, the ability to achieve the desired relationships among the various indices of refraction (and thus the optical properties of the multilayer film) is influenced by the processing conditions used to prepare the multilayer film. In the case of organic polymers which can be oriented by stretching, the films are generally prepared by co-extruding the individual polymers to form a multilayer film and then orienting the film by stretching at a selected temperature, optionally followed by heat-setting at a selected temperature. Alternatively, the extrusion and orientation steps may be performed simultaneously. In the case of polarizers, the film is stretched substantially in one direction (uniaxial orientation), while in the case of reflective films the film is stretched substantially in two directions (biaxial orientation).

The film may be allowed to dimensionally relax in the cross-stretch direction from the natural reduction in cross-stretch (equal to the square root of the stretch ratio); it may simply be constrained to limit any substantial change in cross-stretch dimension; or it may be actively stretched in the cross-stretch dimension. The film may be stretched in the machine direction, as with a length orienter, or in width using a tenter.

The pre-stretch temperature, stretch temperature, stretch rate, stretch ratio, heat set temperature, heat set time, heat set relaxation, and cross-stretch relaxation are selected to yield a multilayer film having the desired refractive index relationship. These variables are inter-dependent; thus, for example, a relatively low stretch rate could be used if coupled with, e.g., a relatively low stretch temperature. It will be apparent to one of ordinary skill how to select the appropriate combination of these variables to achieve the desired multilayer film. In general, however, a stretch ratios in the range from 1:2 to 1:10 (more preferably 1:3 to 1:7) in the stretch direction and from 1:0.2 to 1:10 (more preferably from 1:0.3 to 1:7) orthogonal to the stretch direction is preferred.

Suitable multilayer films may also be prepared using techniques such as spin coating (e.g., as described in Boese et al., J. Polym. Sci.: Part B, 30:1321 (1992) for birefringent polyimides, and vacuum deposition (e.g., as described by Zang et. al., Appl. Phys. Letters, 59:823 (1991) for crystalline organic compounds; the latter technique is particularly useful for certain combinations of crystalline organic compounds and inorganic materials.

Exemplary multilayer reflective mirror films and multilayer reflective polarizers will now be described in the following examples.

EXAMPLE 1

PEN:THV 500, 449, Mirror

A coextruded film containing 449 layers was made by extruding the cast web in one operation and later orienting the film in a laboratory film-stretching apparatus. A Polyethylene naphthalate (PEN) with an Intrinsic Viscosity of 0.53 dl/g (60 wt. % phenol/40 wt. % dichlorobenzene) was delivered by one extruder at a rate of 56 pounds per hour and THV 500 (a fluoropolymer available from Minnesota Mining and Manufacturing Company) was delivered by another extruder at a rate of 11 pounds per hour. The PEN was on the skin layers and 50% of the PEN was present in the two skin layers. The feedblock method was used to generate 57 layers which was passed through three multipliers producing an extrudate of 449 layers. The cast web was 20 mils thick and 12 inches wide. The web was later biaxially oriented using a laboratory stretching device that uses a pantograph to grip a square section of film and simultaneously stretch it in both directions at a uniform rate. A 7.46 cm square of web was loaded into the stretcher at about 100° C. and heated to 140° C. in 60 seconds. Stretching then commenced at 10%/sec (based on original dimensions) until the sample was stretched to about 3.5×3.5. Immediately after the stretching the sample was cooled by blowing room temperature air at it.

Figure 3:
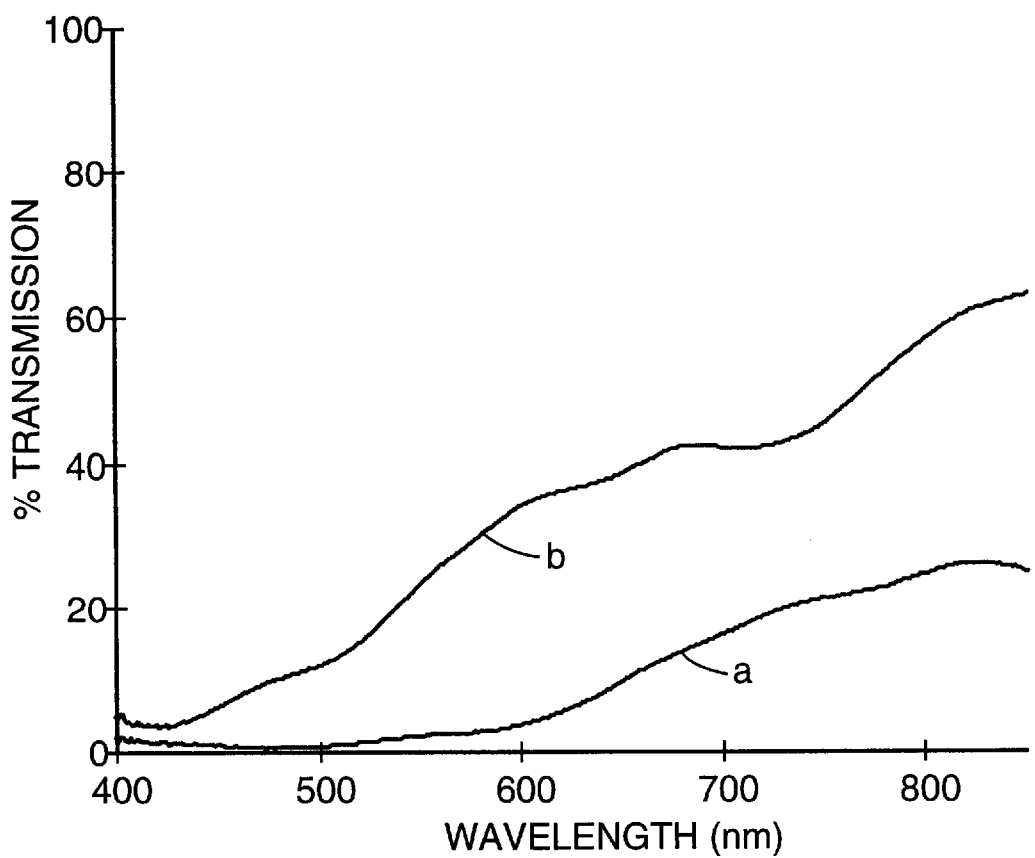
FIGS. 3–6, 7A and 7B depict the optical performance of multilayer optical films described in Examples 1–5.

FIG. 3 shows the transmission of this multilayer film. Curve (a) shows the response at normal incidence, while curve (b) shows the response at 60 degrees for p-polarized light.

EXAMPLE 2

PEN:PMMA, 601, Mirror

A coextruded film containing 601 layers was made on a sequential flat-film-making line via a coextrusion process. Polyethylene Naphthalate (PEN) with an Intrinsic Viscosity of 0.57 dl/g (60 wt. % phenol/40 wt. % dichlorobenzene) was delivered by extruder A at a rate of 114 pounds per hour with 64 pounds per hour going to the feedblock and the rest going to skin layers described below. PMMA (CP-82 from ICI of Americas) was delivered by extruder B at a rate of 61 pounds per hour with all of it going to the feedblock. PEN was on the skin layers of the feedblock. The feedblock method was used to generate 151 layers using the feedblock such as those described in U.S. Pat. No. 3,801,429, after the feedblock two symmetric skin layers were coextruded using extruder C metering about 30 pounds per hour of the same type of PEN delivered by extruder A. This extrudate passed through two multipliers producing an extrudate of about 601 layers. U.S. Pat. No. 3,565,985 describes similar coextrusion multipliers. The extrudate passed through another device that coextruded skin layers at a total rate of 50 pounds per hour of PEN from extruder A. The web was length oriented to a draw ratio of about 3.2 with the web temperature at about 280° F. The film was subsequently preheated to about 310° F. in about 38 seconds and drawn in the transverse direction to a draw ratio of about 4.5 at a rate of about 11% per second. The film was then heat-set at 440° F. with no relaxation allowed. The finished film thickness was about 3 mil.

Figure 4:
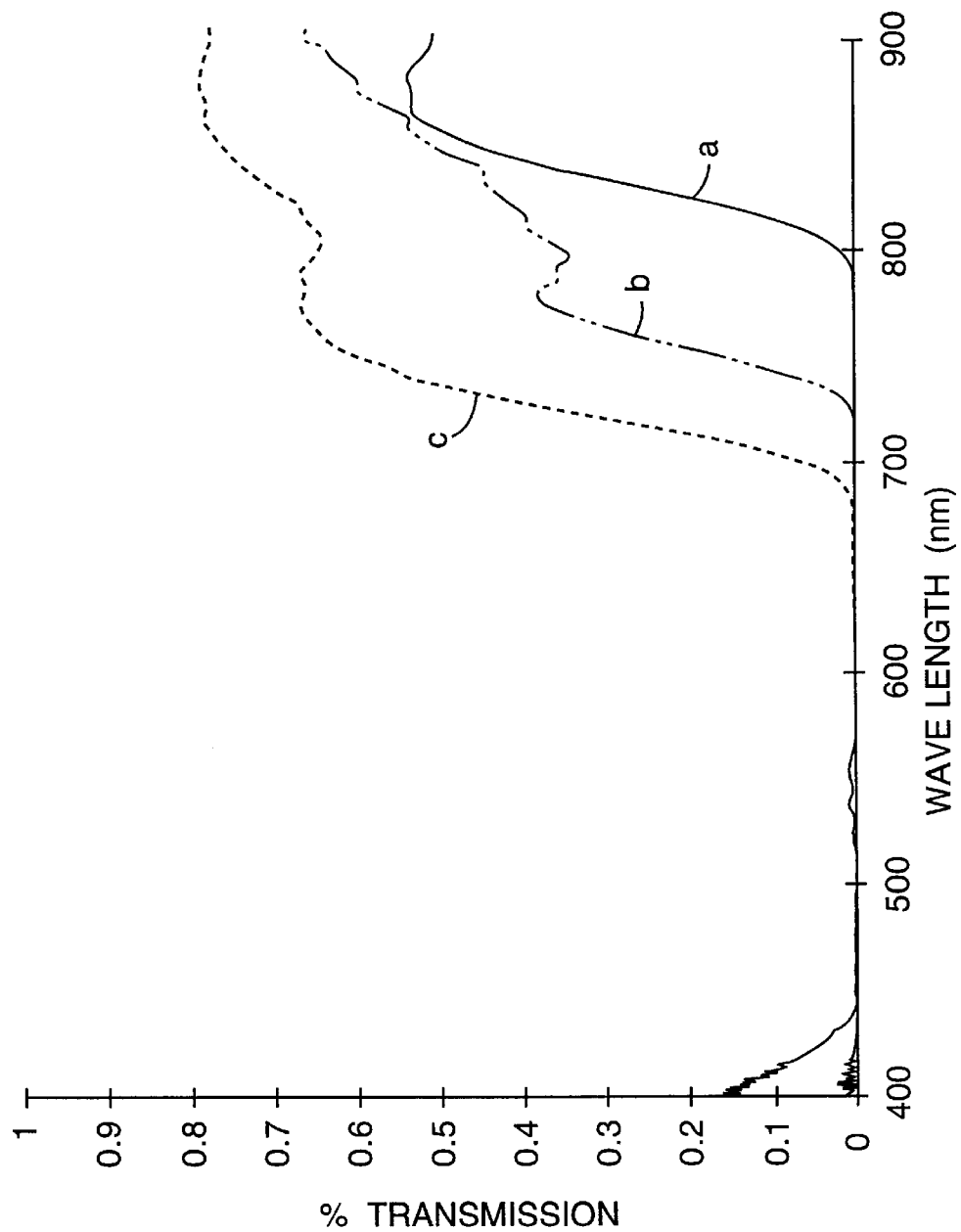

As seen in FIG. 4, curve (a), the bandwidth at normal incidence is about 350 nm with an average in-band extinction of greater than 99%. The amount of optical absorption is difficult to measure because of its low value, but is less than 1%. At an incidence angle of 50° from the normal both s (curve (b)) and p-polarized (curve (c)) light showed similar extinctions, and the bands were shifted to shorter wavelengths as expected. The red band-edge for s-polarized light is not shifted to the blue as much as for p-polarized light due to the expected larger bandwidth for s-polarized light, an due to the lower index seen by the p-polarized light in the PEN layers.

EXAMPLE 3

PEN:PCTG, 449, Polarizer

A coextruded film containing 481 layers was made by extruding the cast web in one operation and later orienting the film in a laboratory film-stretching apparatus. The feedblock method was used with a 61 layer feedblock and three (2×) multipliers. Thick skin layers were added between the final multiplier and the die. Polyethylene naphthalate (PEN) with an intrinsic viscosity of 0.47 dl/g (60 wt. % phenol/40 wt. % dichlorobenzene) was delivered to the feedblock by one extruder at a rate of 25.0 pounds per hour. Glycol modified polyethylene dimethyl cyclohexane terephthalate (PCTG 5445 from Eastman) was delivered by another extruder at a rate of 25.0 pounds per hour. Another stream of PEN from the above extruder was added as skin layers after the multipliers at a rate of 25.0 pounds per hour. The cast web was 0.007 inches thick and 12 inches wide. The web was layer uniaxially oriented using a laboratory stretching device that uses a pantograph to grip a section of film and stretch it in one direction at a uniform rate while it is allowed to freely relax in the other direction. The sample of web loaded was about 5.40 cm wide (the unconstrained direction) and 7.45 cm long between the grippers of the pantograph. The web was loaded into the stretcher at about 100° C. and heated to 135° C. for 45 seconds. Stretching was then commenced at 20%/second (based on original dimensions) until the sample was stretched to about 6:1 (based on gripper to gripper measurements). Immediately after stretching, the sample was cooled by blowing room temperature air at it. In the center, the sample was found to relax by a factor of 2.0.

Figure 5:
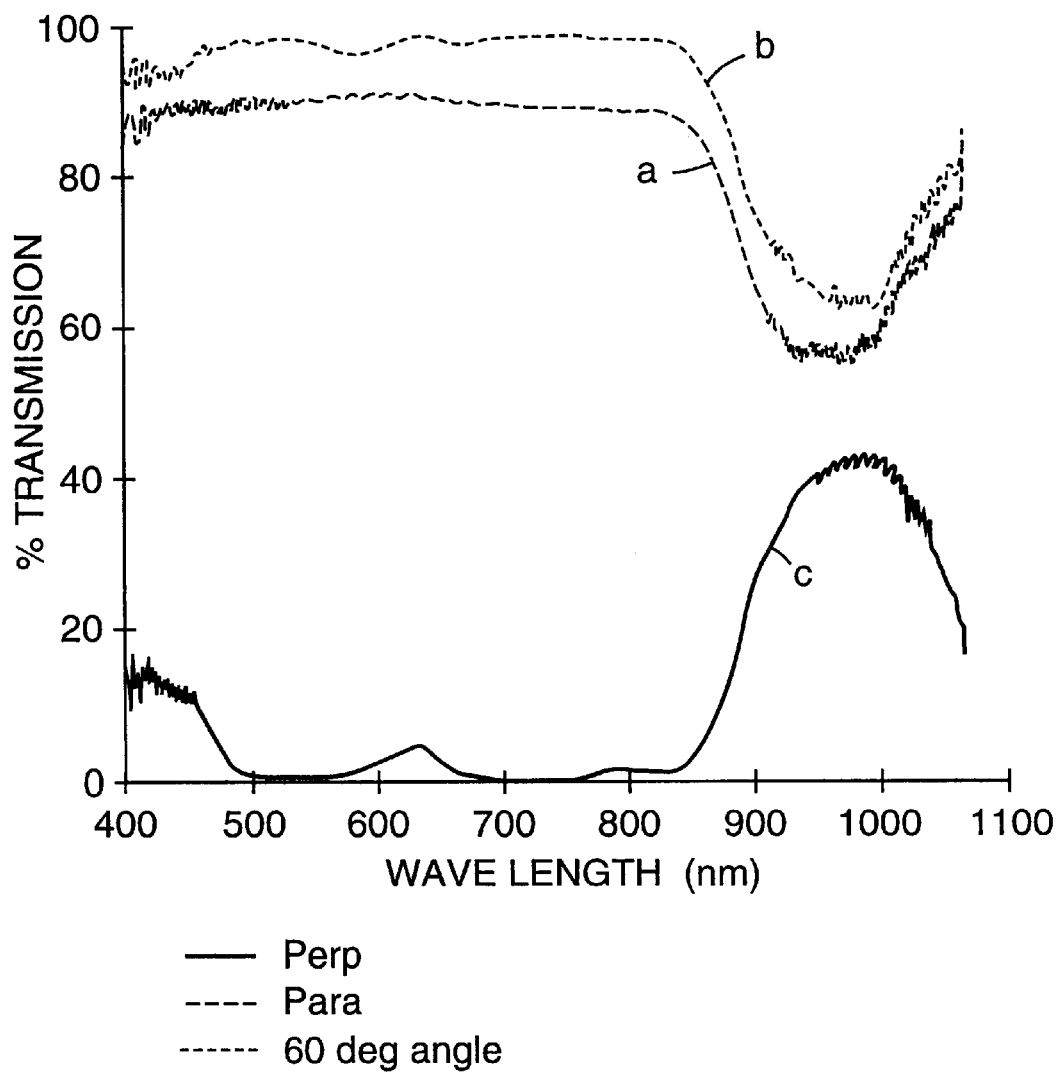

FIG. 5 shows the transmission of this multilayer film where curve a shows transmission of light polarized in the non-stretch direction at normal incidence, curve b shows transmission of p-polarized light polarized in the non-stretched direction at 60° incidence, and curve c shows the transmission of light polarized in the stretch direction at normal incidence. Average transmission for curve a from 400–700 nm is 89.7%, average transmission for curve b from 400–700 nm is 96.9%, and average transmission for curve c from 400–700 nm is 4.0%. % RMS color for curve a is 1.05%, and % RMS color for curve b is 1.44%.

EXAMPLE 4

PEN:CoPEN, 601, Polarizer

A coextruded film containing 601 layers was made on a sequential flat-film-making line via a coextrusion process. A Polyethylene naphthalate (PEN) with an intrinsic viscosity of 0.54 dl/g (60 wt % Phenol plus 40 wt % dichlorobenzene) was delivered by on extruder at a rate of 75 pounds per hour and the coPEN was delivered by another extruder at 65 pounds per hour. The coPEN was a copolymer of 70 mole % 2,6 naphthalene dicarboxylate methyl ester, 15% dimethyl isophthalate and 15% dimethyl terephthalate with ethylene glycol. The feedblock method was used to generate 151 layers. The feedblock was designed to produce a stack of films having a thickness gradient from top to bottom, with a thickness ratio of 1.22 from the thinnest layers to the thickest layers. The PEN skin layers were coextruded on the outside of the optical stack with a total thickness of 8% of the coextruded layers. The optical stack was multiplied by two sequential multipliers. The nominal multiplication ratio of the multipliers were 1.2 and 1.27, respectively. The film was subsequently preheated to 310° F. in about 40 seconds and drawn in the transverse direction to a draw ratio of about 5.0 at a rate of 6% per second. The finished film thickness was about 2 mils.

Figure 6:
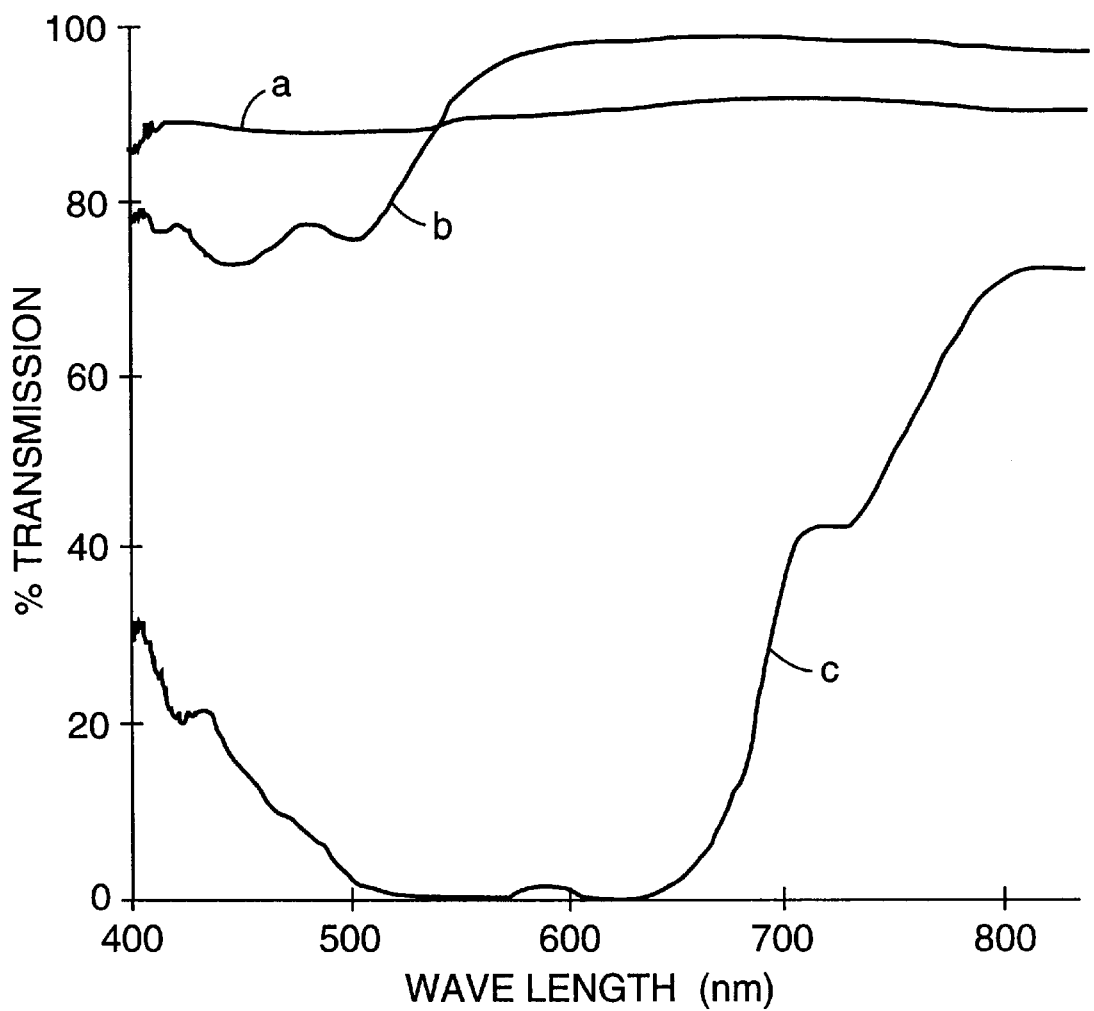

FIG. 6 shows the transmission for this multilayer film. Curve a shows transmission of light polarized in the non-stretch direction at normal incidence, curve b shows transmission of p-polarized light at 60° incidence, and curve c shows transmission of light polarized in the stretch direction at normal incidence. Note the very high transmission of p-polarized light in the non-stretch direction at both normal and 60° incidence (80–100%). Also note the very high reflectance of light polarized in the stretched direction in the visible range (400–700 nm) shown by curve c. Reflectance is nearly 99% between 500 and 650 nm.

EXAMPLE 5

PEN:sPS, 481, Polarizer

A 481 layer multilayer film was made from a polyethylene naphthalate (PEN) with an intrinsic viscosity of 0.56 dl/g measured in 60 wt. % phenol and 40 wt % dichlorobenzene purchased from Eastman Chemicals and a syndiotactic polystyrene (sPS) homopolymer (weight average molecular weight=200,000 Daltons, sampled from Dow Corporation). The PEN was on the outer layers and was extruded at 26 pounds per hour and the sPS at 23 pounds per hour. The feedblock used produced 61 layers with each of the 61 being approximately the same thickness. After the feedblock three (2×) multipliers were used. Equal thickness skin layers containing the same PEN fed to the feedblock were added after the final multiplier at a total rate of 22 pounds per hour. The web was extruded through a 12" wide die to a thickness of about 0.011 inches (0.276 mm). The extrusion temperature was 290° C.

This web was stored at ambient conditions for nine days and then uniaxially oriented on a tenter. The film was preheated to about 320° F. (160° C.) in about 25 seconds and drawn in the transverse direction to a draw ratio of about 6:1 at a rate of about 28% per second. No relaxation was allowed in the stretched direction. The finished film thickness was about 0.0018 inches (0.046 mm).

Figure 7A:
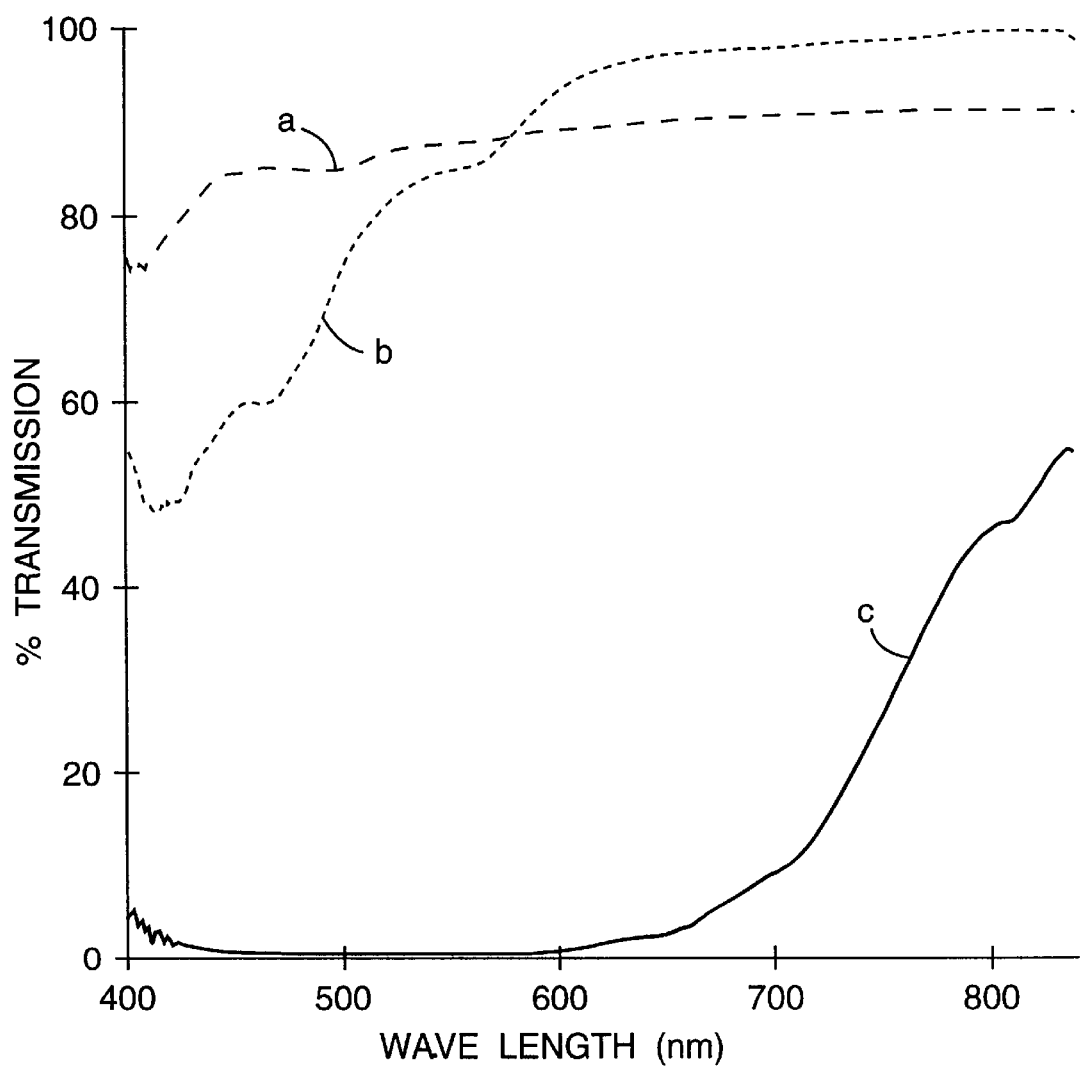

FIG. 7 shows the optical performance of this PEN:sPS reflective polarizer containing 481 layers. Curve a shows transmission of light polarized in the non-stretch direction at normal incidence, curve b shows transmission of p-polarized light at 60° incidence, and curve c shows transmission of light polarized in the stretch direction at normal incidence. Note the very high transmission of p-polarized light at both normal and 60° incidence. Average transmission for curve a over 400–700 nm is 86.2%, the average transmission for curve b over 400–700 nm is 79.7%. Also note the very high reflectance of light polarized in the stretched direction in the visible range (400–700 nm) shown by curve c. The film has an average transmission of 1.6% for curve c between 400 and 700 nm. The % RMS color for curve a is 3.2%, while the % RMS color for curve b is 18.2%.

EXAMPLE 6

PEN:coPEN, 603, Polarizer

A reflecting polarizer comprising 603 layers was made on a sequential flat-film making line via a coextrusion process. A polyethylene naphthalate (PEN) with an intrinsic viscosity of 0.47 dl/g (in 60 wt % phenol plus 40 wt % dichlorobenzene) was delivered by an extruder at a rate of 83 pounds (38 kg) per hour and the CoPEN was delivered by another extruder at 75 pounds (34 kg) per hour. The CoPEN was a copolymer of 70 mole %, 2,6 naphthalene dicarboxylate methyl ester, 15 mole % dimethyl terephthalate, and 15 mole % dimethyl isophthalate with ethylene glycol. The feedblock method was used to generate 151 layers. The feedblock was designed to produce a stack of films having a thickness gradient from top to bottom, with a thickness ratio of 1.22 from the thinnest layers to the thickest layers. This optical stack was multiplied by two sequential multipliers. The nominal multiplication ratio of the multipliers was 1.2 and 1.4, respectively. Between the final multiplier and the die, skin layers were added composed of the same CoPEN described above, delivered by a third extruder at a total rate of 106 pounds (48 kg) per hour. The film was subsequently preheated to 300° F. (150° C.) in about 30 seconds and drawn in the transverse direction to a draw ratio of approximately 6 at an initial rate of about 20% per second. The finished film thickness was approximately 0.0035 inch (0.089 mm).

Figure 7B:
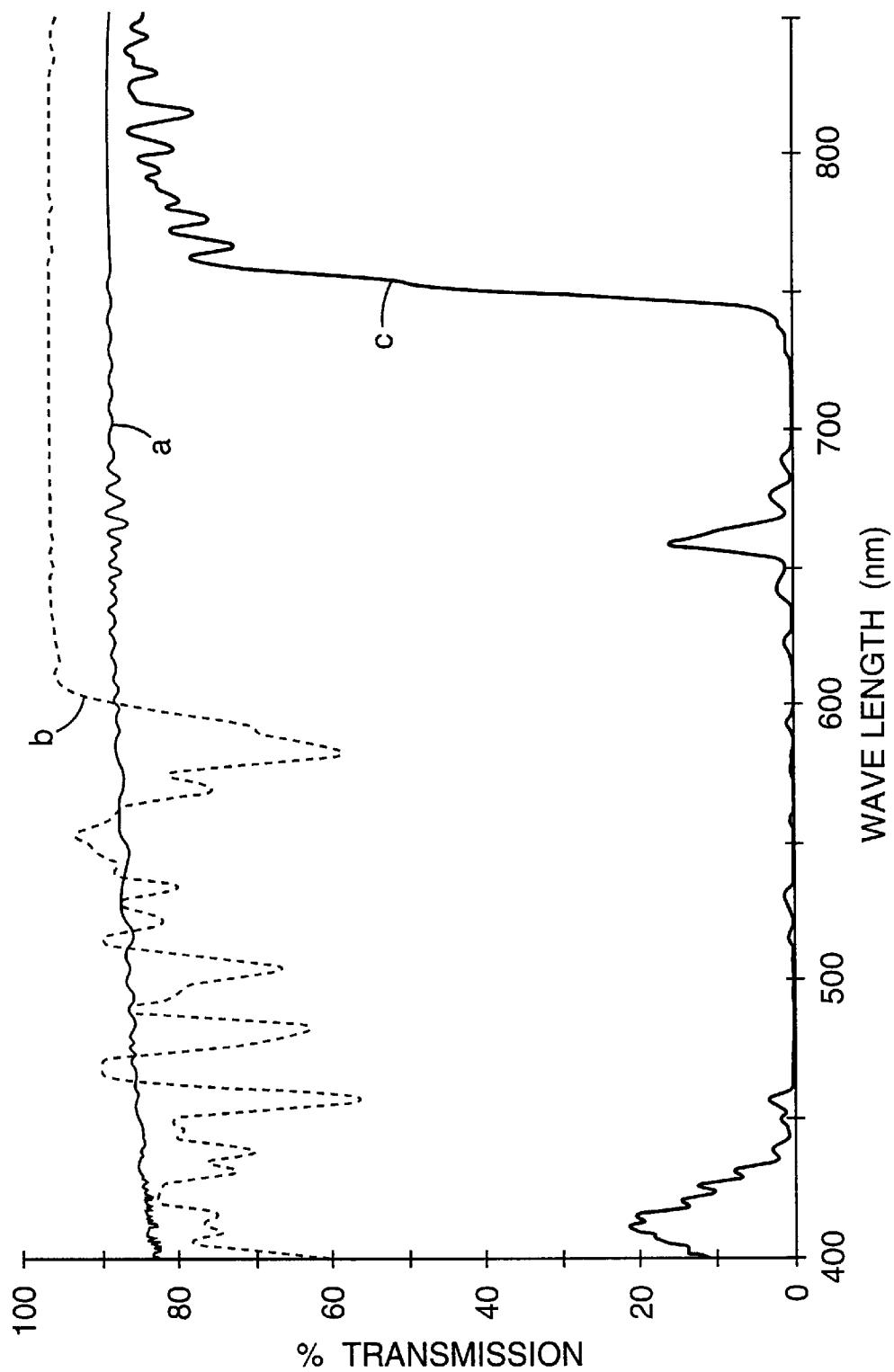

FIG. 7B shows the optical performance of the polarizer of Example 6. Curve a shows transmission of light polarized in the non-stretch direction at normal incidence, curve b shows transmission of p-polarized light in the nonstretch direction at 50 degree angle of incidence, and curve c shows transmission of light polarized in the stretch direction at normal incidence. Note the very high transmission of light polarized in the non-stretch direction. Average transmission for curve a over 400–700 nm is 87%. Also note the very high reflectance of light polarized in the stretched direction in the visible range (400–700 nm) shown by curve c. The film has an average transmission of 2.5% for curve c between 400 and 700 nm. The % RMS color for curve b is 5%.

II. Optical Devices Using Multilayer Optical Films

Figure 8:
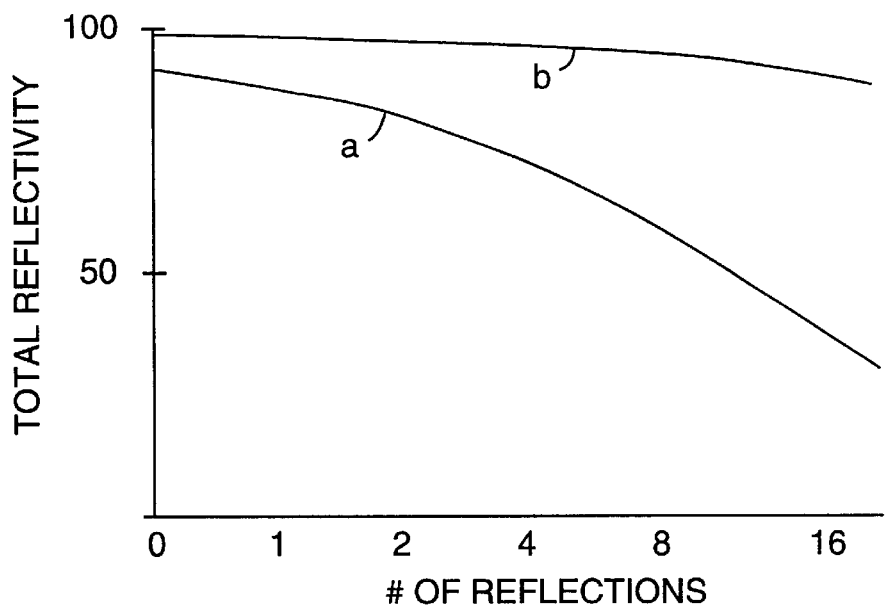
FIG. 8 is a graphical representation illustrating the relationship between the number of reflections experienced by a ray of light (x-axis) as compared to the relative intensity of the light ray (y-axis) for reflective surfaces made of multilayer optical film and a standard reflector.

Optical devices according to the present invention use multilayer optical films to polarize and/or reflect light. The advantages of using multilayer optical film in optical devices involving reflection of light are graphically illustrated in FIG. 8. Curve a shows the total reflectivity as a function of the number of reflections for convention reflector that has 96% reflectivity (i.e., about 4% of the light is absorbed at each reflection). As shown by curve a, the intensity of light which has been reflected decreases significantly after a relatively low number of reflections when the surface reflecting the light absorbs only about 4% of the light. In contrast, curve b shows the total reflectivity for a multilayer mirror film having a reflectivity of about 99.4%. Curve b clearly shows a much smaller decrease in total reflectivity. The difference becomes especially pronounced after only 2–4 reflections.

For example, for five reflections, the intensity of light is about 97% for light reflected from multilayer optical films according to the present invention, while the intensity drops to about 81.5% for light reflected from a conventional reflector which is only about 3.5% less efficient. Although it is difficult to determine the average number of reflections experienced by light in a backlight system, the number of reflections can be expected to increase as aspect ratio (defined more completely below) increase in any given backlight system. Those increased reflections would cause a significant loss in efficiency for backlight systems using conventional reflectors which would not be experienced in backlight systems employing multilayer optical film reflectors according to the present invention.

The practical value of this characteristic is that the efficiency of the present optical device is greatly enhanced as compared to systems employing conventional reflectors. Stated another way, the number of acceptable reflections for a given light ray in optical devices employing multilayer optical film according to the present invention can be significantly increased without substantially impairing the overall output of the device as compared to optical devices employing known reflectors/polarizers. This means that the present optical devices can be used to transmit and transport light over greater distances with better efficiency than presently known conventional reflectors.

Optical devices which incorporate the multilayer optical film can be most generally described as devices in which at least a portion of the light entering and/or exiting the device is reflected from an optical surface comprising the multilayer optical film. For the purpose of this invention, an "optical surface" will be defined as a surface, planar or otherwise, which reflects at least a portion of randomly polarized light incident upon it. More preferably, at least a portion of the light traveling through the optical devices will be reflected from an optical surface more than once, thereby exploiting the advantages of the multilayer optical film.

A subset of optical devices incorporating multilayer optical film according to the present invention will comprise two or more optical surfaces and can generally be categorized into devices in which the optical surfaces are arranged in a parallel or a non-parallel opposing arrangement.

Optical devices with substantially parallel optical surfaces include, but are not limited to: light pipes, light boxes, rectangular light guides, etc. For those devices designed to transmit light from one location to another, such as a light pipe, it is desirable that the optical surfaces absorb and transmit a minimal amount of light incident upon them while reflecting substantially all of the light. In other devices such as light boxes and light guides, it may be desirable to deliver light to a selected area using generally reflective optical surfaces and to then allow for transmission of light out of the device in a known, predetermined manner. In such devices, it may be desirable to provide a portion of the optical surface as partially reflective to allow light to exit the device in a predetermined manner. Examples of such devices will be described more completely below.

Another class of optical devices which include two or more reflective optical surfaces are devices in which the reflective optical surfaces converge towards each other as distance from a light source (or point of entry into the device) increases. This construction is especially useful in optical devices where it is desired to return light emitted from an optical source towards the direction from which the light entered the device. Optical devices with converging reflective optical surfaces will typically reflect a majority of light in a direction generally towards the source of the light.

Yet another class of optical devices which include two or more optical surfaces are devices in which the reflective optical surfaces diverge as distance from a light source (or point of entry into the device) increases. Optical devices with diverging reflective optical surfaces will typically tend to collimate light. The amount and degree of collimation will depend on the location of the light source relative to the narrow end of the device and the rate of divergence of the multilayer reflective optical film surfaces.

In a preferred embodiment, the optical devices are hollow as this will tend to decrease the amount of absorption at each reflection as light is transported by the optical devices.

In the effort to direct light towards a specific target, such as in task lighting, solar collectors, or otherwise, it may be preferred that the diverging optical surfaces form a parabola or cone. If a parabolic shape is used, collimation is best accomplished for light passing through or emanating from the focal point of the parabola. The specifics of designing the shape of such devices will be well known to those skilled in the art and will not be discussed herein.

Figure 9:
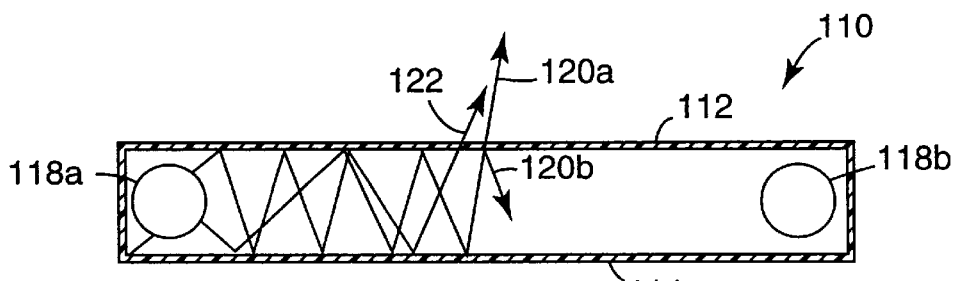
FIG. 9 is schematic cross-sectional diagram of an alternate optical device according to the present invention.
Figure 10:
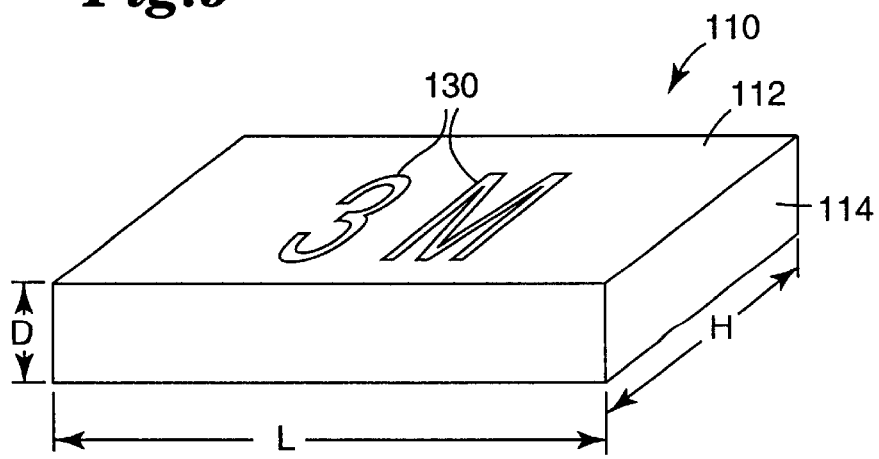
FIG. 10 is a perspective view of the optical device of FIG. 9 in which at least one surface of the device is intended to display a message.

Turning now to the figures in which illustrative examples of optical devices according to the present invention are depicted, FIGS. 9 and 10 depict one illustrative optical device 110 in a cross-sectional schematic view in FIG. 9 and a perspective view in FIG. 10. Optical device 110 is commonly referred to as a light box and can be substantially rectangular as shown or it can take any other shape desired based on aesthetics or functional considerations. Light boxes are typically substantially enclosed volumes in which one or more light sources are located. The volume is preferably lined with a reflective surface and includes either partially reflective areas or voids which allow light to escape from the light box in a predetermined pattern or manner.

The illustrative light box 110 depicted in FIGS. 9 and 10 includes at least two opposing reflective and/or partially reflective optical surfaces 112 and 114 comprised of the multilayer optical film. It is most preferred that all of the interior reflective surfaces of the light box 110 are covered by the multilayer optical film. By using the multilayer optical film according to the present invention for all of the reflective surfaces within the light box 110, absorption losses can be greatly reduced as compared to devices using conventional reflectors and/or polarizers. In some instances, however, all or a portion of either or both optical surfaces 112 and 114 can be constructed from other materials.

Where multilayer optical film is used in any optical device, it will be understood that it can be laminated to a support (which itself may be transparent, opaque reflective or any combination thereof) or it can be otherwise supported using any suitable frame or other support structure because in some instances the multilayer optical film itself may not be rigid enough to be self-supporting in an optical device such as illustrative device 110.

The optical device 110 illustrated in FIG. 9 includes two light sources 118a and 118b, referred to commonly as 118, which emit light into the interior of the device 110. Light emitted from the sources 118 will typically reflect between surfaces 112 and 114 numerous times before exiting the device 110 through a partially reflective area or transmissive void located in surface 112, denoted by reference number 130 in FIG. 10.

For illustration purposes, light rays 120 and 122 are shown as emanating from source 118a and reflecting within the optical device 110 until they exit from areas such as 130 in layer 112. In an illuminated sign depicted as the illustrative optical device 110, areas 130 will typically comprise advertising or other informational messages or, alternatively, may comprise a decorative display of some type. Although only areas 130 are depicted as transmitting light through optical surface 112, it will be understood that all or any portion of both surfaces 112 and 114 may transmit light out of device 110.

Areas 130 which transmit light can be provided of many different materials or constructions. The areas 130 can be made of multilayer optical film or any other transmissive or partially transmissive materials. One way to allow for light transmission through areas 130 is to provide areas in optical surface 112 which are partially reflective and partially transmissive. Partial reflectivity can be imparted to multi-layer optical films in areas 130 according to the present invention by a variety of means.

In one aspect, areas 130 may comprise multi-layered optical film which is uniaxially stretched to allow transmission of light having one plane of polarization while reflecting light having a plane of polarization orthogonal to the transmitted light. Rays 120a and 120b of light as depicted in FIG. 9 illustrate such a situation in which light having one polarization direction is transmitted through multi-layered optical film 130 while light having the orthogonal polarization direction is reflected back into optical device 110.

When areas 130 are provided from a multilayer reflective polarizing film, it is preferable that the optical device 110 include some mechanism for randomizing polarization orientation of the light reflected back into the interior of the device 110. One mechanism for randomizing polarization orientation would be to provide a thin pigmented coating on optical surface 114 to randomize polarization and scatter light reflected from the areas 130. Another mechanism is to add a birefringent polymer film, or to have a birefringent skin layer on the MOF mirror. Any mechanism, however, by which the polarization orientation of returned light 120b can be modified after reflection from the reflective polarizing areas 130 is desirable as it can then be returned to areas 130 and, theoretically, a portion of the light will then have the proper polarization orientation to allow transmission through areas 130 and out of optical device 110.

Light ray 122 depicts the effect of an alternate means of providing for transmission of light through areas 130 in an optical device 110 according to the present invention. Light ray 122 is transmitted through areas 130 without reflection through a void formed in the optical surface 112. As a result, there is no partial reflection of light ray 122 as opposed to light ray 120 as described above. In this situation, optical surface 112 is itself substantially completely reflective, except for those voids in areas 130 which transmit light without substantial reflection.

It will be understood that the term "void" can be used to describe an actual physical aperture through optical surface 112 as well as clear or transparent areas formed in the optical surface 112 which do not substantially reflect light. The number and size of multiple apertures in area 130 of optical surface 112 may be varied to control the amount of light transmitted through the areas 130. At one extreme, areas 130 may even constitute complete voids in optical surface 112, although large voids are typically undesirable to protect the interior of the device 110 from debris, dust, etc.

An alternate embodiment of an optical device 110 can be provided where at least the areas 130 in optical surface 112 do not comprise a multilayer optical film at all, but rather comprise a different class of partially reflective films, such as a structured partially reflective film. Exemplary micro-replicated structured partially reflective films are marketed as Optical Lighting Film, and Brightness Enhancement Film, available from Minnesota Mining and Manufacturing Company, St. Paul, Minn.

In those instances where a less efficient multilayer optical film is used (i.e., some of the light incident upon the multilayer optical film surfaces is lost through transmission), it may be advantageous to provide the back surfaces of the multilayer optical film, i.e., the surface facing the exterior of the device 110, with a thin metal or other reflective coating to reflect light that would otherwise be lost to transmission, thereby improving the reflectivity of the multilayer optical film. It will of course, be understood that the metallic or other reflective coating may suffer from some absorption losses, but the fraction of light transmitted through the film will typically be less than 5% (more preferably less than 1%) of the total light incident on the film. The metallic or other reflective coating may also be useful to reduce visible iridescence if leakage of narrow bands of wavelengths occurs in the multilayer optical film. In general, however, the high efficiency multilayer reflective films are preferred.

Due to the high efficiency of the multilayer optical film in reflecting light in optical devices 110, the number and intensity of light sources 118 needed to provide uniform illumination over the areas 130 can be reduced. Any optical device design can be less concerned about the number of reflections a light ray will make within device 110 before exiting as illustrated in FIG. 10 and described above.

Aspect ratio in a device 110 is typically determined by comparing the depth of the light box, indicated as D in FIG. 10 to the length and height of the device 110, indicated as L and H, respectively. In some instances, aspect ratio may be the ratio of depth D as compared to the area which is defined by the length times the height of optical device 110.

FIG. 11 is a schematic cross-sectional representation of a converging wedge optical device 210, according to the present invention, incorporating multilayer optical film. In any optical device employing a converging wedge design, the optical surfaces 212 and 214 are arranged in a converging relationship in which the optical surfaces converge towards each other as distance from the opening 211 into the device 210 increases. In the preferred embodiment, the surfaces 212 and 214 are comprised of a multilayer optical film. Also, the optical device 210 is preferably hollow to minimize absorption losses.

It will be understood that the optical device 210 could comprise two generally planar optical surfaces 212 and 214. One specific example of a converging wedge design would be a light guide used in a backlight assembly for a liquid crystal display device. Another specific example of an optical device represented in FIG. 11 could comprise a generally conical device having a cross-section taken along the longitudinal axis of the device 210. In a conical device, optical surfaces 212 and 214 may actually be portions of a continuous surface which appears discontinuous due to the cross-sectional nature of the view in FIG. 11.

A light ray 220 is depicted as entering the optical device 210 through opening 211 as shown and is reflected numerous times before exiting in generally the same direction from which it entered the device 210. Optical surfaces 212 and 214 could be comprised of many different materials. For example both surfaces 212 and 214 could be comprised of multilayer optical films according to the present invention and a portion or all of either or both surfaces 212 and 214 could be completely reflective or partially reflective.

If a less efficient multilayer optical film is used for reflective optical surfaces 212 and 214 and it is desired that both surfaces prevent transmission of light, they can be coated on their "exterior" surfaces with a reflective coating such as a thin metallic layer or other reflective coating. That additional layer will help to ensure that layers 212 and 214 do not transmit light. In some instances, however, it may be desirable to provide one or both of the multi-layered optical films 212 and 214 as partially reflective to allow some leakage of light, polarized or not, through surfaces 212 and/or 214 in a uniform or other controlled manner. One specific example of a device 210 where uniform distribution of light is desired is a light guide backlight assembly for a liquid crystal display.

FIG. 12 is a schematic cross-sectional representation of a diverging wedge optical device 310 according to the present invention. In any optical device employing a diverging wedge design, the optical surfaces 312 and 314 are arranged in a diverging relationship in which the surfaces diverge as distance from the light source 318 increases. In a preferred embodiment, the surfaces 312 and 314 are comprised of a multilayer optical film. Also, the optical device 310 is preferably hollow to minimize absorption losses. It will be understood that, like the converging wedge device 210, the diverging wedge depicted in FIG. 12 could comprise two generally planar optical surfaces 312 and 314 or that device 310 could comprise a generally conical, parabolic or other shape in which the depicted cross-section is taken along the longitudinal axis of device 310. In such an optical device, optical surfaces 312 and 314 may actually be portions of a continuous surface which appears discontinuous due to the cross-sectional nature of the view in FIG. 11.

An optical device which includes diverging optical surfaces will tend to collimate light exiting it as light rays 320 and 322 illustrate. The device 310 depicted in FIG. 12 includes a light source 318 located at the entry into device 310. It will, however, be understood that a diverging optical device may include a plurality of sources 318. If device 310 were formed in a roughly parabolic shape, that collimation would be more pronounced if the light source 318 was located proximate the focal point of the parabola. Alternatively, a diverging optical device 310 could also rely on a light generated from a source or sources located away from the actual opening into the diverging optical device 310.

In general, the degree and amount of collimation of light exiting such a device 310 is dependent on a number of factors including the angle of light rays entering the device, the location of the light source, and the shape and/or angular relationship between the optical surfaces 312 and 314.

FIG. 13 is a cross-sectional schematic view of another illustrative optical device 410 formed using the multilayer optical film according to the present invention. The cross-section of device 410 as depicted in FIG. 13 is taken along a longitudinal axis which shows two generally parallel optical surfaces 412 and 414. An additional view is depicted in FIG. 14, which shows a cross-section of device 410 taken transverse to the longitudinal axis. As depicted, device 410 has a generally circular shape.

Optical devices such as device 410 are typically used to transmit light between two locations and are commonly referred to as "light pipes." Such devices have a longitudinal axis and a cross-section transverse to that axis which forms a closed plane figure. Examples of some typical cross-section figures include circles (such as that shown in FIG. 14), ellipses, polygons, closed irregular curves, triangles, squares, rectangles or other polygonal shapes. Any device 410 having a closed plane figure transverse cross-section appears as two surfaces in a longitudinal cross-section as shown in FIG. 13 even though the device 410 may actually be formed from a single continuous optical surface.

Because the multilayer optical film according to the present invention used absorbs substantially none of the light incident upon it, light pipes constructed of multilayer optical film according to the present invention can extend for a relatively large distances without significant loss of throughput.

It is particularly advantageous to use the multilayer optical film with devices such as light pipes in which a large portion of the light travelling through the device approaches the surfaces of the device at shallow angles. Known multi-layered polymer reflective films are not efficient at reflecting light approaching them at shallow angles and, therefore, would suffer from large transmissive losses. The present multilayer optical film, however, is able to reflect such light with the much the same efficiency as light approaching the film normal to the surfaces.

Alternately, it will be understood that a device such as light pipe 410 may include sections which are partially transmissive, thus allowing light to escape from the device. The transmission mechanisms may include multilayer reflective polarizing sections, voids or any other mechanism as described with respect to the illustrative embodiments above. Such designs do, however, start to resemble light boxes or guides depicted and described in conjunction with FIGS. 9 and 10, above.

Figure 15:
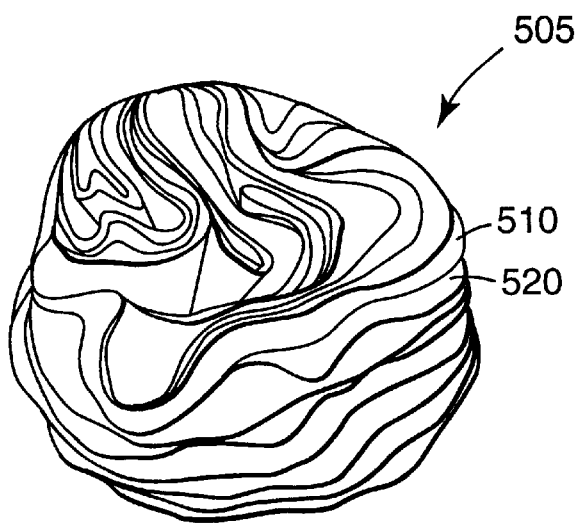
FIG. 15 is a perspective view of one illustrative optical device constructed using multilayer optical films according to the present invention.

FIG. 15 illustrates another optical device according to the present invention. The optical device 505 depicted in FIG. 15 could be used, for example, in a decorative application such as a flower or a bow. Device 505 is constructed of a plurality of multilayer optical film layers (such as layers 510 and 520) connected generally in their centers by a post or some other mechanism. Although the layers are depicted as generally circular, it will be understood that many different shapes could be provided.

The layers can be wrinkled or otherwise manipulated to give the device 505 volume. The wrinkling of multilayer optical film layers also provides device 510 with multiple converging wedges arranged generally vertically to return light incident on the device 505 to a viewer.

Although not required, leakage or transmission of light through the layers of multilayer optical film in device 505 is not a great concern as transmitted light can be reflected out of the device 505 by the adjacent diverging wedge formed by the next layer of film. Because of the adjacent diverging wedges in device 505, it makes highly efficient use of leakage between the vertically arranged converging wedges because light escaping one wedge could be reflected back out of the adjacent wedge into which the light is transmitted. As a result, device 505 has an unusually brilliant appearance.

The multilayer optical film may also be provided in the form of elongated strips. Such strips of film can be advantageously used to form other configurations of optical devices which can be used, for example, as decorative bows, such as any of those described in U.S. Pat. Nos. 3,637,455 (Pearson et al.); 4,329,382 (Truskolaski et al.); 4,476,168 (Aoyama); and 4,515,837 (Chong); and in U.S. patent application Ser. Nos. 08/031,560 (Huss) and 08/153,373 (Huss); the entire disclosures of all of which are incorporated herein by reference.

Optical device 505 illustrates another significant advantage of the optical devices incorporating multilayer optical film according to the present invention, i.e., that the devices need not exhibit symmetry to be effective. In fact, optical devices according to the present invention need not exhibit symmetry in any plane or about any line but can still function effectively and efficiently due to the low absorbance and high reflectance both at normal angles and at high angles away from the normal of the multilayer optical films.

Symmetry in optical devices is provided in many instances to reduce or minimize the number of reflections experienced by light travelling through the devices. Minimizing reflections is particularly important when using conventional reflectors because of their relatively high absorptivities (see FIG. 8 and the accompanying description above). Because optical devices using multilayer optical film according to the present invention experience significantly reduced absorption, it is much less important to minimize the number of reflections and, consequently, symmetry is not as important to maintain the efficiency of the optical devices.

As a result, although the illustrative optical devices described above do generally exhibit symmetry about at least one axis, the present invention should not be limited to optical devices having an axis of symmetry. Furthermore, the present invention has been described above with respect to illustrative examples to which modifications may be made without departing from the scope of the invention as defined by the appended claims.

What is claimed is:

1. An optical device comprising at least two opposing optical surfaces,
    wherein each of the optical surfaces comprises a reflective multilayer polymeric film that transmits less than 2% of perpendicularly incident light of at least one polarization orientation over an intended bandwidth,
    and further wherein the optical device absorbs less than about 10% of the incident light after five reflections from the multilayer film of the at least two opposing optical surfaces.

2. The optical device of claim 1, wherein the device comprises a light guide.

3. The optical device of claim 2, wherein the transmissive area comprises a void.

4. The optical device of claim 1, wherein the optical surfaces define a volume.

5. The optical device of claim 1, wherein at least one of the optical surfaces comprises a transmissive area.

6. The optical device of claim 3, wherein the transmissive area preferentially transmits the incident light with the at least one polarization orientation and preferentially reflects the incident light with a different polarization orientation.

7. The optical device of claim 1, wherein one of the two opposing optical surfaces comprises a mirror and the other optical surface comprises a reflective polarizer.

8. An optical device comprising a body having at least two opposing optical surfaces, at least a portion of each of the optical surfaces comprising a reflective film that reflects perpendicularly incident light of at least one polarization orientation over an intended bandwidth, wherein the reflective film of each of the optical surfaces comprises a plurality of layers, and further wherein at least one layer of the plurality of layers is birefringent.

9. The optical device of claim 8, wherein the device comprises a light guide.

10. The optical device of claim 8, wherein the optical surfaces define a volume.

11. The optical device of claim 8, wherein at least one of the optical surfaces comprises a transmissive area.

12. The optical device of claim 11, wherein the transmissive area comprises a void in the optical surface.

13. The optical device of claim 11, wherein the transmissive area preferentially transmits light having a first polarization orientation and preferentially reflects light having a second polarization orientation.

14. The optical device of claim 8, wherein one of the at least two opposing optical surfaces comprises a mirror and the other optical surface comprises a reflective polarizer.

15. The optical device of claim 8, wherein the reflective film transmits less than 2% of the incident light, and still further wherein the optical device absorbs less than about 10% of the incident light after five reflections from the reflective film of the opposing optical surfaces.

16. The optical device of claim 15, wherein the device comprises a light guide.

17. The optical device of claim 15, wherein at least one of the optical surfaces comprises a transmissive area.

18. An optical device comprising:
    a plurality of diverging wedges, each diverging wedge of the plurality of diverging wedges comprising two opposing optical surfaces, wherein each of the optical surfaces comprise a multilayer optical film,
    wherein the multilayer optical film comprises a plurality of layers, and further wherein at least one layer of the plurality of layers is birefringent.

19. The optical device of claim 18, wherein the plurality of diverging wedges are connected to each other.

20. The optical device of claim 18, wherein the plurality of diverging wedges comprise a plurality of adjacent diverging wedges.

21. A decorative article comprising:
    a plurality of diverging wedges, each diverging wedge of the plurality of diverging wedges comprising two opposing optical surfaces, wherein each of the optical surfaces comprise a multilayer optical film,
    wherein the multilayer optical film comprises a plurality of layers, and further wherein at least one layer of the plurality of layers is birefringent.

22. The decorative article of claim 21, wherein the plurality of diverging wedges are connected to each other.

23. The decorative article of claim 21, wherein the plurality of diverging wedges comprise a plurality of adjacent diverging wedges.

24. The decorative article of claim 21, wherein the article comprises a bow.

25. The decorative article of claim 21, wherein the article comprises a flower.

* * * * *

UNITED STATES PATENT AND TRADEMARK OFFICE
CERTIFICATE OF CORRECTION

PATENT NO. : 6,641,883 B2
DATED : November 4, 2003
INVENTOR(S) : Weber, Michael F.

It is certified that error appears in the above-identified patent and that said Letters Patent is hereby corrected as shown below:

Title page,
Item [56], References Cited, U.S. PATENT DOCUMENTS, please replace "3,772,882" with -- 3,773,882 --.

Column 3,
Line 59, after "5,882,774", insert -- which is incorporated herein by reference --.

Column 4,
Line 15, delete "Which" and insert therefor -- which --.

Column 19,
Line 36, delete "claim 3" and insert therefor -- claim 5 --.

Signed and Sealed this

Thirteenth Day of July, 2004

JON W. DUDAS
*Acting Director of the United States Patent and Trademark Office*